United States Patent
Chan et al.

(10) Patent No.: US 12,554,017 B2
(45) Date of Patent: Feb. 17, 2026

(54) EBS/TOF/RGB CAMERA FOR SMART SURVEILLANCE AND INTRUDER DETECTION

(71) Applicant: SONY SEMICONDUCTOR SOLUTIONS CORPORATION, Kanagawa (JP)

(72) Inventors: Kevin Chan, Milpitas, CA (US); Ping Wah Wong, Sunnyvale, CA (US); Sa Xiao, San Jose, CA (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 611 days.

(21) Appl. No.: 17/782,842

(22) PCT Filed: Dec. 4, 2020

(86) PCT No.: PCT/JP2020/045310
§ 371 (c)(1),
(2) Date: Jun. 6, 2022

(87) PCT Pub. No.: WO2021/117642
PCT Pub. Date: Jun. 17, 2021

(65) Prior Publication Data
US 2023/0008723 A1    Jan. 12, 2023

Related U.S. Application Data

(63) Continuation of application No. 16/859,905, filed on Apr. 27, 2020, now abandoned.
(Continued)

(51) Int. Cl.
*G01S 17/86* (2020.01)
*G08B 13/196* (2006.01)
(Continued)

(52) U.S. Cl.
CPC ........ *G01S 17/86* (2020.01); *G08B 13/19656* (2013.01); *H04N 7/188* (2013.01); *H04N 23/72* (2023.01); *G06F 18/2148* (2023.01)

(58) Field of Classification Search
CPC ........ G01S 17/86; H04N 23/72; H04N 7/188; G08B 13/19656; G06F 18/2148
(Continued)

(56) References Cited

U.S. PATENT DOCUMENTS 5,159,642 A    10/1992    Kosaka
6,674,837 B1    1/2004    Taskar
(Continued)

FOREIGN PATENT DOCUMENTS

CN    102803991 A    11/2012
CN    103533234 A    1/2014
(Continued)

OTHER PUBLICATIONS

International Search Report prepared by the European Patent Office on Apr. 16, 2021, for International Application No. PCT/JP2020/045310, 6 pgs.
(Continued)

*Primary Examiner* — Joseph G Ustaris
*Assistant Examiner* — Jimmy S Lee
(74) *Attorney, Agent, or Firm* — Sheridan Ross PC

(57) ABSTRACT

A sensor system with a plurality of sensors or sensor functions is provided. The sensors can include an event detection sensor, a time of flight sensor, and imaging sensor. The different sensors can be implemented on the same or different substrates. Accordingly, sensors with pixels having different or shared functions can be included in the sensor system. In operation, an event detection signal from an event detection sensor causes the operation of a time of flight sensor to be initiated. In response to the detection of an
(Continued)

Flow chart 1 object within a critical range by the time of flight sensor, the imaging sensor is activated. The image sensing and event detection pixels can be provided as part of different arrays of pixels, or can be included within a common array of pixels.

17 Claims, 26 Drawing Sheets

Related U.S. Application Data

(60) Provisional application No. 62/947,721, filed on Dec. 13, 2019.

(51) Int. Cl.
*H04N 7/18* (2006.01)
*H04N 23/72* (2023.01)
*G06F 18/214* (2023.01)

(58) Field of Classification Search
USPC .......................................................... 348/152
See application file for complete search history.

(56) References Cited

U.S. PATENT DOCUMENTS

| | | | |
|---|---|---|---|
| 9,728,077 B1* | 8/2017 | Fu | G08B 27/003 |
| 10,097,804 B2 | 10/2018 | Sato et al. | |
| 10,345,447 B1 | 7/2019 | Hicks | |
| 10,999,524 B1 | 5/2021 | Duelli et al. | |
| 2006/0140445 A1 | 6/2006 | Cusack, Jr. | |
| 2007/0109433 A1 | 5/2007 | Yamada et al. | |
| 2009/0040356 A1 | 2/2009 | Shih et al. | |
| 2009/0066782 A1 | 3/2009 | Choi et al. | |
| 2010/0231738 A1 | 9/2010 | Border et al. | |
| 2011/0025900 A1 | 2/2011 | Kondo | |
| 2012/0057029 A1 | 3/2012 | Border et al. | |
| 2013/0123015 A1 | 5/2013 | Jung et al. | |
| 2014/0009648 A1 | 1/2014 | Kim et al. | |
| 2014/0111423 A1 | 4/2014 | Park et al. | |
| 2014/0368712 A1 | 12/2014 | Park et al. | |
| 2014/0375820 A1* | 12/2014 | Priyantha | H04N 25/131 |
| | | | 348/169 |
| 2015/0229889 A1 | 8/2015 | Boettiger | |
| 2015/0317304 A1 | 11/2015 | An et al. | |
| 2016/0037110 A1 | 2/2016 | Choi et al. | |
| 2016/0119522 A1 | 4/2016 | Choi et al. | |
| 2017/0011525 A1 | 1/2017 | Kim et al. | |
| 2017/0132794 A1 | 5/2017 | Lee et al. | |
| 2017/0366737 A1* | 12/2017 | Yang | G01S 17/10 |
| 2018/0137647 A1 | 5/2018 | Li et al. | |
| 2018/0167575 A1 | 6/2018 | Watanabe et al. | |
| 2018/0173948 A1 | 6/2018 | Gousev et al. | |
| 2018/0267663 A1* | 9/2018 | Cho | G01S 11/12 |
| 2018/0342081 A1 | 11/2018 | Kim et al. | |
| 2019/0007678 A1 | 1/2019 | Perez-Ramirez et al. | |
| 2019/0007690 A1 | 1/2019 | Varadarajan et al. | |
| 2019/0037156 A1 | 1/2019 | Mikami | |
| 2019/0096081 A1 | 3/2019 | Gupta et al. | |
| 2019/0207931 A1 | 7/2019 | Alameh et al. | |
| 2019/0213309 A1 | 7/2019 | Morestin et al. | |
| 2019/0325269 A1 | 10/2019 | Bagherinezhad et al. | |
| 2019/0355169 A1 | 11/2019 | Sapienza et al. | |
| 2019/0356849 A1 | 11/2019 | Sapienza et al. | |
| 2020/0084403 A1 | 3/2020 | Suh et al. | |
| 2020/0105111 A1 | 4/2020 | Messer et al. | |
| 2020/0106772 A1 | 4/2020 | Alameh et al. | |
| 2020/0117952 A1 | 4/2020 | Carroll et al. | |
| 2020/0175845 A1* | 6/2020 | Hu | G08B 29/183 |
| 2020/0342303 A1 | 10/2020 | Stent | |
| 2020/0404177 A1 | 12/2020 | Sapienza et al. | |
| 2021/0105421 A1 | 4/2021 | Kukreja et al. | |
| 2021/0185264 A1 | 6/2021 | Wong et al. | |
| 2021/0185265 A1 | 6/2021 | Wong et al. | |
| 2021/0185266 A1 | 6/2021 | Chan et al. | |
| 2021/0185284 A1 | 6/2021 | Chan et al. | |
| 2021/0208262 A1* | 7/2021 | Silver | G01S 7/497 |

FOREIGN PATENT DOCUMENTS

| | | |
|---|---|---|
| CN | 103533263 A | 1/2014 |
| CN | 105432072 A | 3/2016 |
| CN | 206313891 U | 7/2017 |
| CN | 108027239 A | 5/2018 |
| CN | 108182428 A | 6/2018 |
| CN | 109146929 A | 1/2019 |
| EP | 3425898 | 1/2019 |
| EP | 3438872 A1 | 2/2019 |
| EP | 3800580 | 4/2021 |
| JP | 2018026131 A | 2/2018 |
| KR | 101951361 | 2/2019 |
| WO | WO-2019135411 A1 | 7/2019 |

OTHER PUBLICATIONS

Written Opinion prepared by the European Patent Office on Apr. 16, 2021, for International Application No. PCT/JP2020/045310, 13 pgs.
Official Action for U.S. Appl. No. 17/782,822, dated Aug. 31, 2023, 13 pages.
Official Action for U.S. Appl. No. 17/782,822, dated Jan. 25, 2024, 15 pages.
Notice of Allowance for U.S. Appl. No. 17/782,832, dated Sep. 14, 2023, 9 pages.
Official Action for U.S. Appl. No. 17/782,828, dated Sep. 19, 2023, 10 pages.
Official Action for U.S. Appl. No. 17/782,828, dated Mar. 12, 2024, 10 pages.
Medathati et al., "Bio-inspired computer vision: Towards a synergistic approach," Computer Vision and Image Understanding, vol. 150, Apr. 29, 2016, pp. 1-30.
International Search Report and Written Opinion for International (PCT) Patent Application No. PCT/JP2020/045297, dated Feb. 25, 2021, 5 pages.
International Search Report and Written Opinion for International (PCT) Patent Application No. PCT/JP2020/045310, dated Apr. 26, 2021, 19 pages.
International Search Report and Written Opinion for International (PCT) Patent Application No. PCT/JP2020/045466, dated May 7, 2021, 19 pages.
International Search Report and Written Opinion for International (PCT) Patent Application No. PCT/JP2020/045468, dated Feb. 23, 2021, 10 pages.
Official Action for U.S. Appl. No. 16/859,928, dated May 10, 2021, 14 pages.
Corrected Official Action for U.S. Appl. No. 16/859,928, dated May 11, 2021, 15 pages.
Official Action for U.S. Appl. No. 16/859,928, dated Sep. 23, 2021, 15 pages.
Official Action for U.S. Appl. No. 16/859,928, dated Feb. 4, 2022, 13 pages.
Official Action for U.S. Appl. No. 16/859,882, dated Aug. 4, 2021, 16 pages.
Official Action for U.S. Appl. No. 16/859,882, dated Dec. 13, 2021, 18 pages.
Notice of Allowance for U.S. Appl. No. 16/859,882, dated Mar. 4, 2022, 10 pages.
Official Action for U.S. Appl. No. 16/859,943, dated Apr. 1, 2021, 10 pages.
Official Action for U.S. Appl. No. 16/859,943, dated Sep. 17, 2021, 11 pages.
Official Action for U.S. Appl. No. 16/859,943, dated Feb. 7, 2022, 13 pages.
Official Action for U.S. Appl. No. 16/859,905, dated Jan. 29, 2021, 6 pages. Restriction Requirement.
Official Action for U.S. Appl. No. 16/859,905, dated Mar. 29, 2021, 15 pages.

(56) References Cited

OTHER PUBLICATIONS

Official Action for U.S. Appl. No. 16/859,905, dated Sep. 17, 2021, 15 pages.
Official Action for U.S. Appl. No. 16/859,905, dated Feb. 4, 2022, 17 pages.
Official Action for U.S. Appl. No. 16/859,928, dated Aug. 3, 2022, 15 pages.
Official Action for U.S. Appl. No. 17/782,832, dated Jan. 31, 2023, 18 pages.
Official Action for U.S. Appl. No. 17/782,832, dated Jun. 13, 2023, 20 pages.
Official Action for U.S. Appl. No. 16/859,943, dated Sep. 12, 2022, 11 pages.
Official Action for U.S. Appl. No. 17/782,828, dated Feb. 1, 2023, 7 pages.
Official Action for U.S. Appl. No. 17/782,828, dated May 26, 2023, 9 pages.
Official Action for U.S. Appl. No. 16/859,905, dated Aug. 11, 2022, 19 pages.

\* cited by examiner

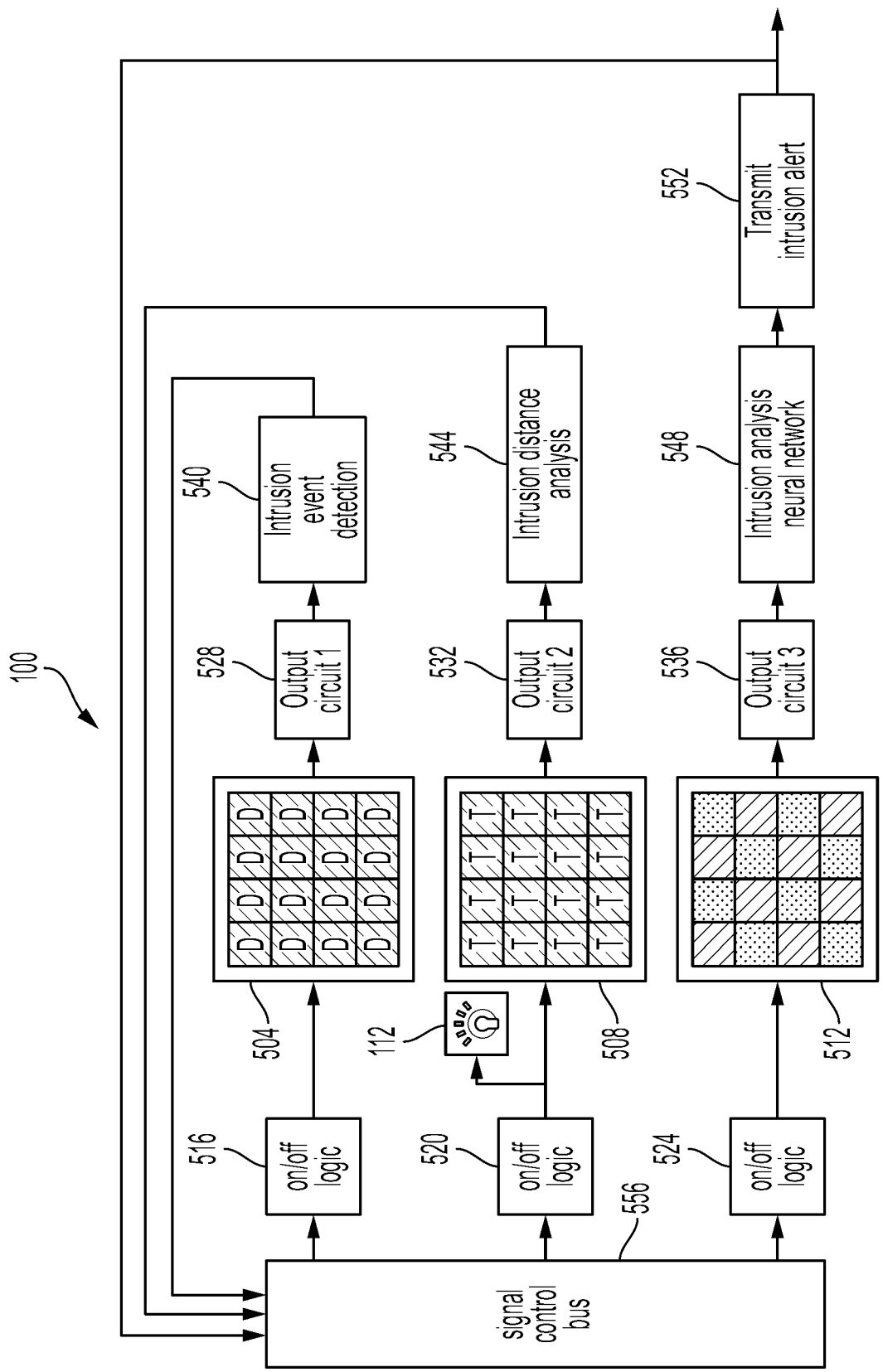

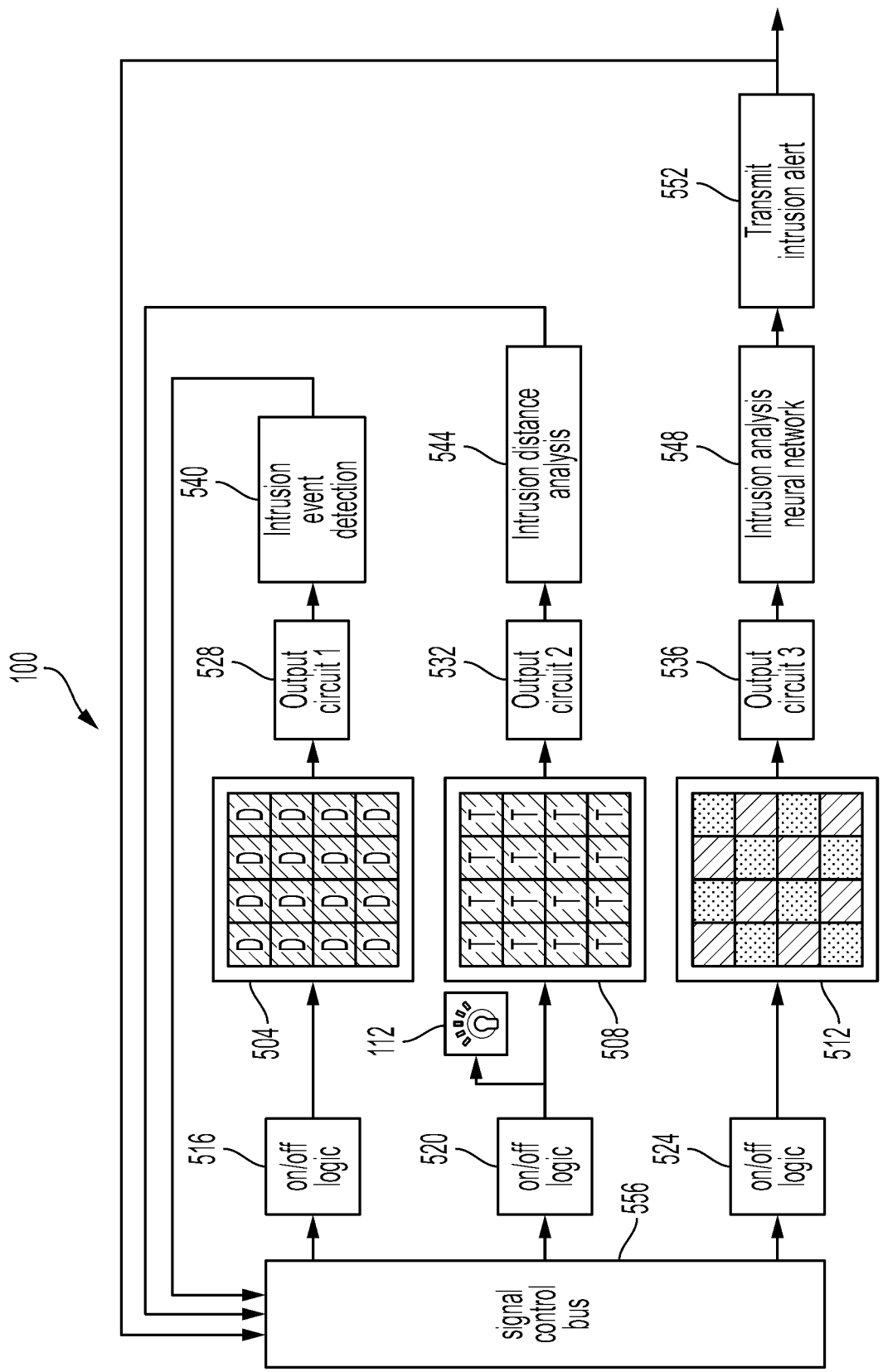

EBS/TOF/RGB CAMERA FOR SMART SURVEILLANCE AND INTRUDER DETECTION

CROSS REFERENCE TO RELATED APPLICATIONS

This application is a national stage application under 35 U.S.C. 371 and claims the benefit of PCT Application No. PCT/JP2020/045310, having an international filing date of 4 Dec. 2020, which designated the United States, which PCT application claimed the benefit of U.S. application Ser. No. 16/859,905, filed 27 Apr. 2020, and 62/947,721, filed 13 Dec. 2019, the entire disclosures of each of which are incorporated herein by reference.

TECHNICAL FIELD

The present disclosure relates to cameras with event based sensor, time of flight, and image sensor capabilities, and to controlling the operating modes of the cameras.

BACKGROUND

In the related art, a synchronization-type solid-state imaging device that captures image data in synchronization with a synchronization signal such as a vertical synchronization signal has been used in an imaging device and the like. In the typical synchronization-type solid-state imaging device, it is necessary to operate at a high frame rate in order to acquire accurately objects that move at a high speed. However, the time required to readout all imaging elements from the imaging device will place a limit on the highest frame rate that the imaging device can operate at. This in turn places a limit on the ability of the imaging device to capture fast moving objects. Thus it is difficult to cope with cases in which relatively high-speed and low latency processing is demanded, such as in fields demanding high speed (e.g. real time) processing, such as autonomous vehicles, robotics, and the like. In this regard, there is suggested a non-synchronization-type solid-state imaging device in which a detection circuit is provided for every pixel to detect a situation in which a change of a light-reception amount exceeds a threshold value as an address event in real time. The non-synchronization-type solid-state imaging device that detects the address event for every pixel is also referred to as an event based sensor (EBS).

Time of flight (ToF) sensors have been developed to determine the range from a camera to an object. In a typical implementation, a light source that outputs light at a selected wavelength or range of wavelengths, and optionally an optical bandpass or longpass filter are included as part of the sensor system. The time required for the light output from the light source, reflect off of an object within a field of view of the camera, and return to the sensor, can be used to calculate the range to the object. However, operation of a time of flight sensor is relatively power intensive.

Cameras with image sensors that obtain grayscale or color images of a scene are well known. Although such image sensors can be similar or less power intensive than time of flight sensors, they generally consume more power than EBS sensors. In addition, image sensors typically operate at a predetermined frame rate, and therefore do not provide the high speed and low latency response that is available from a EBS sensor.

A camera that combines EBS and regular frame based imaging can be provided. In such a system, the detection of an event using the EBS capabilities of the camera can be used as a trigger to initiate the operation of the imaging functions of the camera. However, such systems have resulted in inefficient data transmission and object tracking by the camera by not considering the distance of object from the camera.

SUMMARY

Technical Problem

A camera with a combination of EBS and regular frame based imaging in which the operation of the imaging functions is triggered in response to the detection of an event and the detection of an object within a selected range of the camera can overcome some of the limitations of using a regular imaging type device alone or a regular imaging device in combination with a EBS sensor to reliably detect events while providing efficient operation. However, such systems continue to suffer from various deficiencies, particularly in certain operating scenarios. For example, activating the entire area of an imaging sensor in response to the detection of an event by a EBS sensor, without validating the actual presence of an object or the distance of the object within the field of view of the camera, can cause an inefficiency in data transmission and processing. For example, a moving train may be detected by the camera. If the moving train is too far away from the camera, it may not be of interest. In addition, activation of the entire area of the imaging sensor can result in an efficiency in power consumption. Although ToF sensors are available that can determine a range to an object, such sensors have not been effectively integrated with other sensors to provide an efficient surveillance or intruder detection system.

Therefore, the present disclosure provides cameras, sensor systems, devices, and methods that are capable of providing imaging, object proximity detection, and event detection functions with improved image sensor efficiency and effectiveness as compared to other configurations.

Solution to Problem

In accordance with embodiments and aspects of the present disclosure, a camera or sensor system with a combination of EBS, ToF, and regular frame based imaging sensors in which the operation of the imaging functions is triggered in response to the detection of an event and the detection of an object within a selected range of the camera is provided that overcomes the limitations of using a regular imaging type device alone or a regular imaging device in combination with a EBS sensor to reliably detect events while providing efficient operation. In particular, a EBS sensor provides event detection capabilities. A ToF sensor provides range determination capabilities. An image sensor (e.g. red, green, blue image sensor) provides imaging capabilities. The EBS, ToF and image sensor capabilities may be provided by separate EBS, ToF, and imaging sensor devices. Alternatively, various sensor types can be combined. For example, ToF sensing capabilities may be provided by a separate ToF sensor, while EBS and image sensing capabilities may also be implemented by a sensor device having combined EBS and imaging sensor capabilities. A sensor device having combined EBS and imaging sensor capabilities can include a sensor device with an array of pixels that includes both EBS and image sensing pixels. Moreover, a combined EBS and image sensor can include photoelectric conversion regions that are provided as part of pixels that perform both EBS and image sensing functions. In addition, a sensor having combined EBS, ToF, and imaging sensor capabilities can also be provided. For ease of description, the discussion herein will refer to EBS, ToF, and image sensor functions as being provided by separate EBS, ToF, and image sensors, however, unless specifically stated otherwise, it should be understood that the EBS, ToF and image sensors can be integrated into fewer than three sensor devices. In particular, the sensors can be combined in various ways in two sensors on a single sensor device.

In operation, an event detected by the EBS sensor results in activation of the ToF sensor. In response to the ToF sensor detecting an object, or an object within a particular range, the image sensor can be activated. In accordance with further embodiments, an event detected by the EBS sensor results in activation of both the ToF sensor and the image sensor.

In accordance with at least some embodiments of the present disclosure, the characteristics of an object detected by the EBS sensor can be analyzed in connection with determining the operating parameters of the image sensor. For instance, a neural network or other decision making facility can determine whether a detected event has been triggered by an object within a desired object category. If a desired object category has been detected, the ToF sensor can be activated to determine if the object is within a selected range. Imaging of the object by the image sensor can then be triggered if and when the object enters the selected range. Imaging can continue while the object is within a selected range or while the object is within the field of view of the system. In accordance with further embodiments of the present disclosure, the operation of the image sensor can be continued until an object has been analyzed and determined to be unimportant.

In accordance with at least some embodiments and aspects of the present disclosure, the area of the image senor that is activated can vary. For example, rather than activating all of the pixels included in an image sensor, only those pixels within a region of interest occupied by or surrounding the desired object can be activated. Further actions can then be taken. For instance, data from the activated area of the image sensor, corresponding to the region of interest, can be analyzed, for example by a neural network or other decision making facility, to perform object recognition, object classification, gesture recognition, or the like.

In general, it is desirable to discontinue operation of the ToF sensor and the image sensor and return to EBS sensor operation only in order to conserve power. Embodiments and aspects of the present disclosure can discontinue operation of the ToF sensor, the image sensor, or both the ToF sensor and the image sensor, and return the system to a EBS mode when certain conditions are satisfied. These can include after a determination is made that nothing of interest is occurring. For instance, imaging of an object can be discontinued, and the ToF sensor and image sensor can be returned to sleep mode after an object that was previously moving has stopped. As another example, operation of the ToF sensor can be discontinued, but operation of the image sensor can be continued, after a determination that an object has entered a selected area or is within a selected range. Image sensor operation can also be discontinued after an object has been identified, and it is determined that continued imaging of the identified object is not required or desired. As another example, ToF sensor and/or image sensor operation can be discontinued after an object has moved out of the imaged scene or has moved a certain minimum distance from a monitored area or the system. As still another example, ToF sensor and/or image sensor operation can be discontinued after a predetermined period of time has elapsed. In accordance with embodiments of the present disclosure, EBS sensor operation remains active continuously, whether or not other sensors are in active operation.

The present disclosure can provide cameras, systems, or devices with event based sensing, time of flight, and imaging capabilities that are capable of improved power consumption, data transmission, and data processing efficiencies.

BRIEF DESCRIPTION OF DRAWINGS

FIG. 5 is a block diagram illustrating aspects of a sensor system in accordance with embodiments of the present disclosure.

FIG. 12B is a block diagram of a sensor system configured to implement the operations of FIG. 12A.

DESCRIPTION OF EMBODIMENTS

Figure 1:
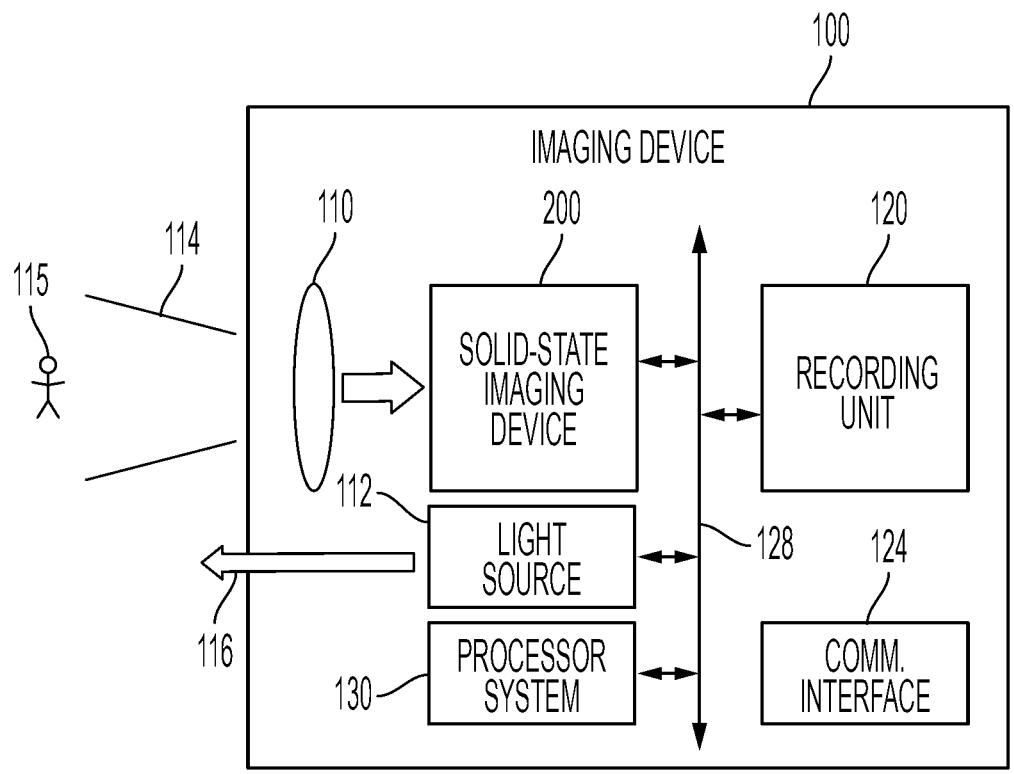
FIG. 1 is a block diagram illustrating a schematic configuration example of a sensor system in accordance with embodiments of the present disclosure.

Hereinafter, embodiments of the present disclosure will be described in detail on the basis of the accompanying drawings. Furthermore, in the following embodiments, the same reference numeral will be given to the same or equivalent portion or element, and redundant description thereof will be omitted.

A typical event based sensor (EBS) employs a so-called event-driven type driving method in which the existence or nonexistence of address event ignition is detected for every unit pixel, and a pixel signal is read out from a unit pixel in which the address event ignition and ignition time information is detected. A EBS or event detection sensor responds to a change in intensity asynchronously. Intensity change is correlated with a change in photocurrent, and if this change exceeds a constant threshold value it could be detected as an event.

A time of flight (ToF) sensor operates to detect a distance to an object or objects within a scene. In general, a ToF depth sensor includes a light source and an imaging device including one or more pixels for sensing reflected light. The elapsed time between the initial emission of light from the light source and the receipt of reflected light at a pixel generally corresponds to a distance from an object. Direct ToF sensors may measure the elapsed time itself to calculate the distance to an object, while indirect ToF sensors may measure the phase delay between the emitted light and the reflected light and translate the phase delay into a distance. The depth values obtained from a plurality of pixels can be used to create a three dimension representation of an object.

An image sensor operates to capture a view or image of a scene. Pixels within an array of pixels provide information regarding the intensity of the light received from an area of a scene from an imaging lens or lens assembly, which together with the array of pixels defines a field of view of the sensor. In a typical implementation, pixels within the array are sensitive to light of different wavelengths, which allows color information to be captured. For example, the pixels can be arranged in groups of four, with one of the pixels sensitive to red light, two of the pixels sensitive to green light, and one pixel sensitive to blue light. Accordingly, such sensors are commonly known as RGB sensors. Other color sensitivity arrangements, such as cyan, magenta, and yellow (CMY), can also be used. The different wavelength sensitivities can be achieved in various ways, such as by using color filters or by configuring pixels as stacked image sensor pixels.

As used herein, a unit pixel represents a minimum unit of a pixel or unit pixel including one photoelectric conversion element (also referred to as "light-receiving element"), and can correspond to each dot in image data that is read out from an image sensor as an example. In addition, the address event represents an event that occurs for every address that is allocable to each of a plurality of the unit pixels which are arranged in a two-dimensional lattice shape.

FIG. 1 is a block diagram illustrating a schematic configuration example of a sensor system 100 according to at least some embodiments of the present disclosure. As illustrated in FIG. 1, for example, a sensor system 100 includes an imaging lens 110, a solid-state imaging device or image sensor 200, a light source 112, a recording unit 120, a communication interface 124, and a processor system or control system 130. The various components of the sensor system 100 may be interconnected to one another by a communications bus 128 or signal lines. As examples, the sensor system 100 can be provided as or as part of a camera that is mounted in an industrial robot, an in-vehicle camera, or as part of or in connection with other devices or instruments.

The imaging lens 110 can include an optical system that collects light from within a field of view 114. An object 115 may or may not be present within the field of view. The collected or incident light is directed (e.g. condensed) onto a light-receiving surface of the image sensor 200. In particular, the imaging lens 110 can collect light from within a selected area of a scene by directing the field of view 114 to encompass that portion of the scene.

The light-receiving surface is a surface of a substrate on which photoelectric conversion elements of pixels 310 included in the image sensor 200 are arranged. The image sensor 200 photoelectrically converts the incident light to generate image data. As discussed herein, the image sensor 200 can include different sets of photoelectric conversion elements disposed on the same or different substrates. Moreover, the image sensor 200 can include photoelectric conversion elements that perform single or multiple functions. These functions can include event detection, time of flight, and imaging functions. In addition, the image sensor 200 can execute predetermined signal processing such as noise removal and white balance adjustment with respect to the generated image data. A result obtained by the signal processing and a detection signal indicating the existence or nonexistence of an address event ignition and ignition time information can be output by the image sensor 200 to the processor system 130. A method of generating the detection signal indicating the existence or nonexistence of the address event ignition will be described later.

The light source 112 can be operated to output light 116 having a selected wavelength or range of wavelengths. The output light 116 can be directed so that it illuminates at least a portion of the scene within the field of view 114. Light reflected from an object or surface 115 within the scene can then be received by photoelectronic conversion elements of pixels of the image sensor operating in a time of flight mode to determine a distance to the surface or object, as described in greater detail elsewhere herein.

The recording system 120 is, for example, constituted by a flash memory, a dynamic random access memory (DRAM), a static random access memory (SRAM), or the like, and records data provided from the image sensor 200.

The processor system 130 is, for example, constituted by a central processing unit (CPU) and the like. For example, the processor system 130 can include one or more general purpose processors, controllers, field programmable gate arrays (FPGAs), graphical processing units (GPUs), application specific integrated circuits (ASIC), or combinations thereof. Moreover, the processor system 130 can execute application programming or routines, stored as software or firmware in memory or data storage included in or interconnected to the processor system 130 to perform various functions and methods as described herein. For example, the processor system 130 can process data output from the image sensor 200. For example, as described herein, the processor system 130 can process event detection signals output by the EBS sensor function or portion of the image sensor 200. The processor system 130 can also operate the light source 112 and can process pixel signals generated in response to the receipt of light from the light source 112 reflected from an object or surface 115 within a scene to determine a distance to the object or surface. In addition, the processor system 130 can control the imaging sensor function or operation of a portion of the solid-state imaging device, at least in part in response to event detection signals, distance determinations, or both event detection signals and distance determinations. The processor system 130 can also control components of the sensor system 100 in addition to the image sensor 200 and the light source 112, such as the operation of the recording unit 120, the communication interface 124, focusing and shutter operations that might be supported by the imaging lens 110, and the like. In accordance with further embodiments of the present disclosure, the processor system 130 can implement advanced processing capabilities, including but not limited to neural network and artificial intelligence capabilities and functions, as described herein.

Next, a configuration example of the image sensor 200 will be described in detail with reference to the accompanying drawings.

Figure 2:
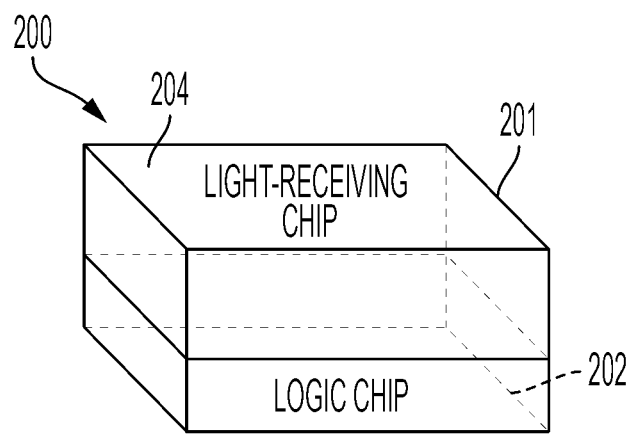
FIG. 2 is a view illustrating a lamination structure example of a sensor system in accordance with embodiments of the present disclosure.

FIG. 2 is a view illustrating a lamination structure example of an image sensor 200 in accordance with at least some embodiments of the present disclosure. As illustrated in FIG. 2, the image sensor 200 can have a structure in which a light-receiving chip 201 and a logic chip 202 are vertically laminated. A side of the light receiving chip 201 opposite the logic chip 202 is a light receiving surface 204. In joining of the light-receiving chip 201 and the logic chip 202, for example, so-called direct joining in which joining surfaces of the chips are planarized, and the chips are laminated with an inter-electron force can be used. However, there is no limitation thereto, and for example, so-called Cu—Cu joining in which copper (Cu) electrode pads formed on joining surfaces are bonded, bump joining, and the like can also be used.

In addition, the light-receiving chip 201 and the logic chip 202 are electrically connected to each other, for example, through a connection portion such as a through-silicon via (TSV) that penetrates through a semiconductor substrate. In the connection using the TSV, for example, a so-called twin TSV method in which two TSVs including a TSV that is formed in the light-receiving chip 201 and a TSV that is formed from the light-receiving chip 201 to the logic chip 202 are connected to each other on chip external surfaces, a so-called shared TSV method in which the light-receiving chip 201 and the logic chip 202 are connected with a TSV that penetrates through both the chips, and the like can be employed.

However, in the case of using the Cu—Cu joining or the bump joining in the joining of the light-receiving chip 201 and the logic chip 202, both the light-receiving chip 201 and the logic chip 202 are electrically connected to each other through a Cu—Cu joint or a bump joint.

As can be appreciated by one of skill in the art after consideration of the present disclosure, an imaging device 200 implemented as connected light receiving 201 and logic 202 chips can include image sensor 200 components disposed as part of the light receiving chip 201, with some or all of the processor system 130 components disposed as part of the logic chip 202. Other components, such as the recording unit 120 and communication interface components can be distributed amongst one or both of the chips 201 and 202. In accordance with still other embodiments, a data storage or other chip can be laminated and electrically connected to the light receiving 201 and logic 202 chips. Moreover, the light receiving chip can include multiple substrates joined to respective logic chips 202 or to a common logic chip 202, for example where the image sensor 200 includes multiple sensor devices.

Figure 3:
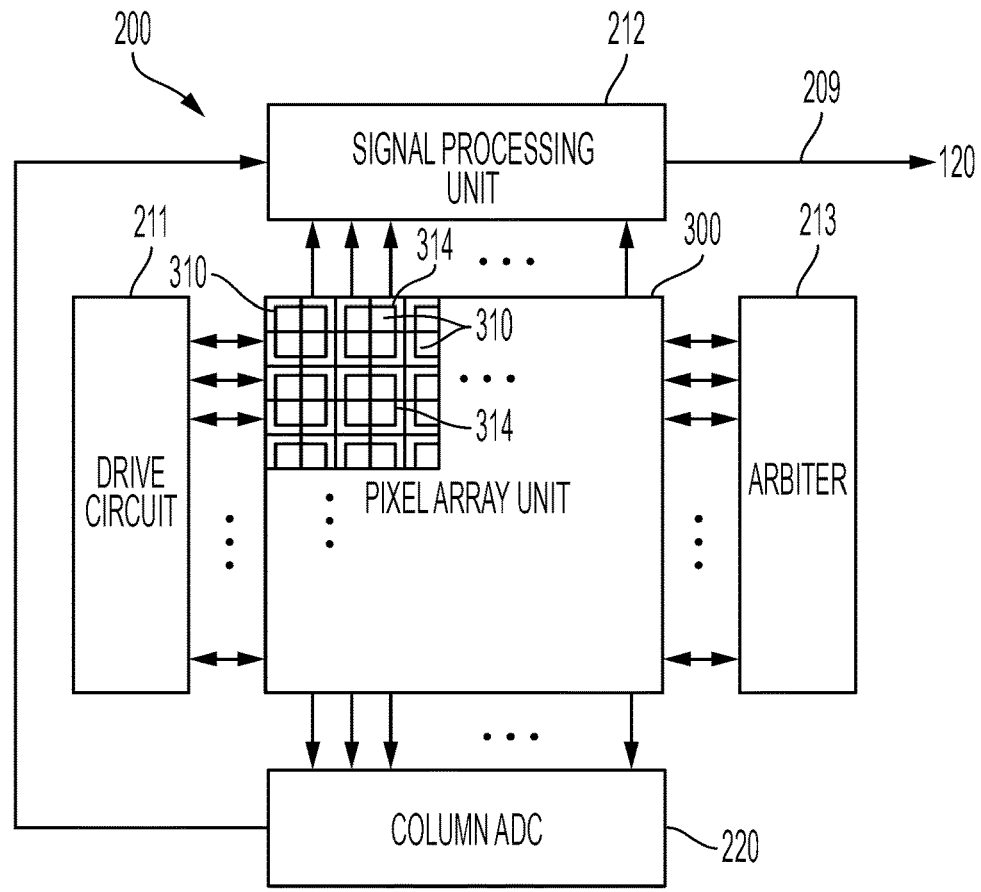
FIG. 3 is a block diagram illustrating a functional configuration example of a sensor system in accordance with embodiments of the present disclosure.

FIG. 3 is a block diagram illustrating a functional configuration example of the image sensor 200 according to at least some embodiments of the present disclosure. As illustrated in FIG. 3, the image sensor 200 can include a drive circuit 211, a signal processor 212, an arbiter 213, a column ADC 220, and a pixel array 300. Some or all of the components can be entirely or partially integrated into, or implemented by, the processor system 130.

A plurality of unit cells or pixels 310, also referred to herein simply as pixels 310, are arranged in the pixel array 300. Details of the unit pixels 310 will be described later. For example, each of the unit pixels 310 includes a photoelectric conversion element such as a photodiode, and a circuit that generates a pixel signal of a voltage value corresponding to the amount of charge generated in the photoelectric conversion element, hereinafter, referred to as a pixel circuit. Moreover, as discussed in greater detail elsewhere herein, the pixel circuit can include either or both of a first or imaging signal generation circuit and a second or address event detection readout circuit. Each photoelectric conversion element can be associated with a respective pixel circuit, or multiple photoelectric conversion elements can be associated with a common pixel circuit.

In this example, the plurality of unit pixels 310 are arranged in the pixel array 300 in a two-dimensional lattice shape. The plurality of unit pixels 310 may be grouped into a plurality of pixel blocks or groups, each including a predetermined number of unit pixels. Hereinafter, an assembly of unit pixels which are arranged in a horizontal direction is referred to as a "row", and an assembly of unit pixels which are arranged in a direction orthogonal to the row is referred to as a "column".

Each of the unit pixels 310 generates charges corresponding to an amount of light received at the respective photoelectric conversion element. In addition, at least some of the unit pixels 310 can be operated to detect the existence or nonexistence of address event ignition on the basis of whether or not a value of a current (hereinafter, referred to as a photocurrent) produced by charges generated in the photoelectric conversion element or a variation amount thereof exceeds a predetermined threshold value. When the address event is ignited, a signal is output to the arbiter 213. At least some of the pixels 310 can also be operated to obtain timing information regarding the receipt of light generated by the light source 112 and reflected from an object or surface within the scene.

The arbiter 213 arbitrates requests received from the unit pixels 310 performing the event detection function, and transmits a predetermined response to the unit pixel 310 which issues the request on the basis of the arbitration result. The unit pixel 310 which receives the response supplies a detection signal indicating the existence or nonexistence of the address event ignition (hereinafter, simply referred to as "address event detection signal") to the drive circuit 211 and the signal processor 212.

The drive circuit 211 drives each of the unit pixels 310, and allows each of the unit pixels 310 to output a pixel signal to the column ADC 220.

For every unit pixel 310 column, the column ADC 220 converts an analog pixel signal from the column into a digital signal. In addition, the column ADC 220 supplies a digital signal generated through the conversion to the signal processor 212.

The signal processor 212 executes predetermined signal processing such as correlated double sampling (CDS) processing (noise removal) and white balance adjustment with respect to the digital signal transmitted from the column ADC 220. In addition, the signal processor 212 supplies a signal processing result and an address event detection signal to the recording unit 120 through the signal line 209.

The unit pixels 310 within the pixel array unit 300 may be disposed in pixel groups 314. In the configuration illustrated in FIG. 3, for example, the pixel array unit 300 is constituted by pixel groups 314 that include an assembly of unit pixels 310 that receive wavelength components necessary to reconstruct color information from a scene. For example, in the case of reconstructing a color on the basis of three primary colors of RGB, in the pixel array unit 300, optical color filter materials can be deposited onto the pixels according to a predetermined color filter array to control light of desired wavelengths to reach a pixel surface. Specifically, a unit pixel 310 that receives light of a red (R) color, a unit pixel 310 that receives light of a green (G) color, and a unit pixel 310 that receives light of a blue (B) color are arranged in groups 314a according to the predetermined color filter array.

Examples of the color filter array configurations include various arrays or pixel groups such as a Bayer array of 2×2 pixels, a color filter array of 3×3 pixels which is employed in an X-Trans (registered trademark) CMOS sensor (hereinafter, also referred to as "X-Trans (registered trademark) type array"), a Quad Bayer array of 4×4 pixels (also referred to as "Quadra array"), and a color filter of 4×4 pixels in which a white RGB color filter is combined to the Bayer array (hereinafter, also referred to as "white RGB array"). In addition, and as discussed in greater detail elsewhere herein, event detection pixels can be interspersed or included within the pixel array 300. As also discussed in greater detail elsewhere herein, the event detection pixels may be provided as dedicated event detection pixels, which only perform an event detection function, or as combined event detection and image sensing pixels, which perform both event detection and image sensor functions.

Figure 4:
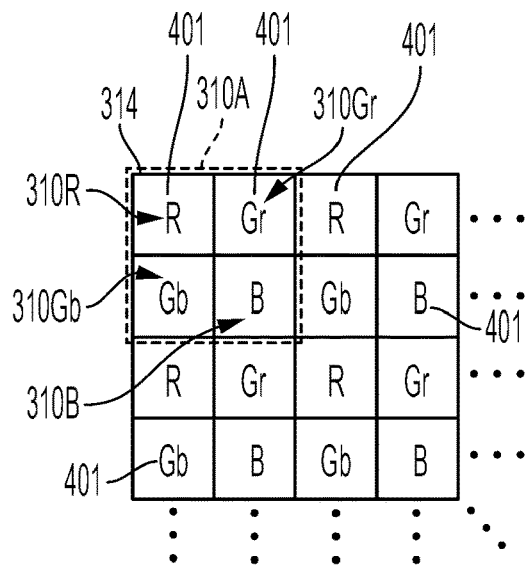
FIG. 4 illustrates an array example of unit pixels in accordance with embodiments of the present disclosure in a case of employing a Bayer array in a color filter array.

FIG. 4 is a schematic view illustrating an array example of unit pixels 310 in the case of employing pixel groups 314 with an arrangement of unit pixels 310 and associated color filters in the color filter array configured to form a plurality of Bayer arrays 310A. As illustrated in FIG. 4, in the case of employing the Bayer array as the color filter array configuration, in the pixel array 300, a basic pattern 310A including a total of four unit pixels 310 of 2×2 pixels is repetitively arranged in a column direction and a row direction. For example, the basic pattern 310A is constituted by a unit pixel 310R including a color filter 401 of a red (R) color, a unit pixel 310Gr including a color filter 401 of a green (Gr) color, a unit pixel 310Gb including a color filter 401 of a green (Gb) color, and a unit pixel 310B including a color filter 401 of a blue (B) color.

FIG. 5 is a block diagram illustrating aspects of a sensor system 100 in accordance with embodiments of the present disclosure. In general, the sensor system 100 includes a EBS sensor or set of pixels 504, a time of flight (ToF) sensor or set of pixels 508, and an image sensor or set of pixels 512. The sensors or pixel sets 504, 508, and 512 are operated in response to respective on/off logic 516, 520, and 524. The on/off logic 516, 520, and 524 can be implemented or controlled by the processor system 130. Signals generated by the sensors or pixel sets 504, 508, and 512 are passed through and processed by output circuits 528, 532, and 536.

Signals output from the output circuit 528 associated with the EBS sensor or set of pixels 504 are delivered to an intrusion event detection facility or function 540. The intrusion event detection facility or function 540 can be implemented by the processor system 130. Signals output from the output circuit 532 associated with the ToF sensor or set of pixels 508 are delivered to an intrusion distance analysis facility or function 544. The intrusion distance analysis facility or function can be implemented by the processor system 130. Signals output from the output circuit 536 associated with the image sensor or set of pixels 512 are delivered to an intrusion analysis facility or function 548. The intrusion analysis facility or function can include or can be implemented by a neural network, and further can be implemented by the processor system 130. In response to a determination that an intrusion has or is occurring, the intrusion analysis facility 548 can transmit an intrusion alert 552.

Outputs from the intrusion event detection facility 540, the intrusion distance analysis facility 544, and a transmitted intrusion alert 552 output from the intrusion analysis facility 548 can be provided to a signal control bus 556. The signal control bus 556 can in turn control or implement the on/off logic 516, 520, and 524. Alternatively or in addition, the signal control bus 556 can simply transport the various signals it receives to the on/off logic 516, 520, and 524.

Figure 6A:
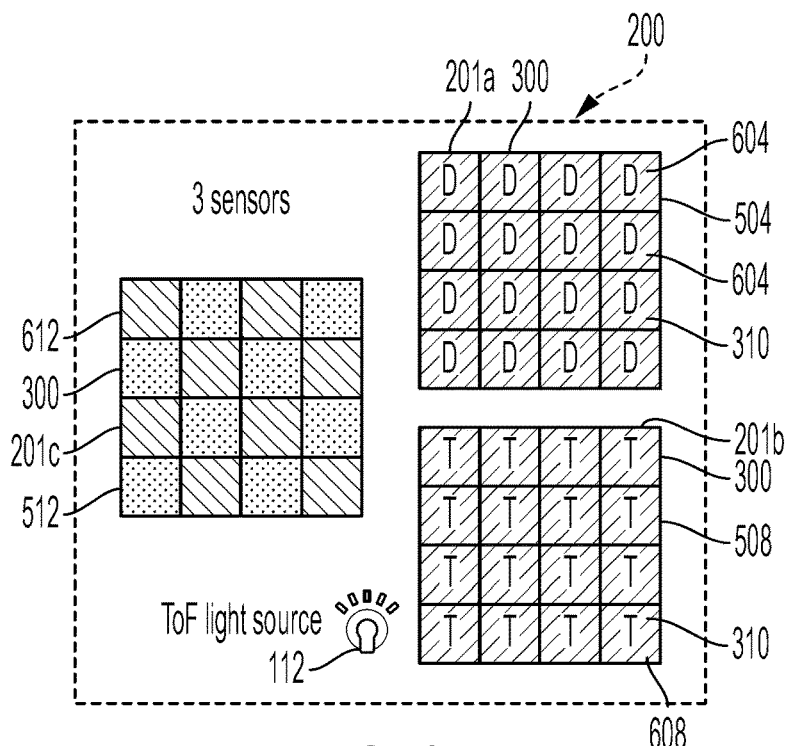
FIG. 6A illustrates aspects of sensors of a sensor system in accordance with embodiments of the present disclosure.

FIGS. 6A-6E depict various configuration examples of a sensor system 100, and in particular of arrangements of solid-state imaging device or image sensor 200 pixels 310, in accordance with embodiments of the present disclosure. More particularly, FIG. 6A depicts an image sensor 200 having a first or EBS sensor 504, which includes an array 300 of pixels 310 in the form of address event detection pixels 604 disposed on a first light receiving chip or substrate 201a; a second or ToF sensor 508, which includes an array 300 of pixels 310 in the form of ToF pixels 608 disposed on a second light receiving chip or substrate 201b; and a third or imaging sensor 512, which includes an array 300 of pixels 310 in the form of image sensing pixels 612 disposed on a third light receiving chip or substrate 201c. The light source 112 for the ToF sensor 508 can also be included as part of the image sensor 200. As can be appreciated by one of skill in the art after consideration of the present disclosure, a sensor system 100 including separate EBS 504, ToF 508, and imaging 512 sensors can be configured with separate lens assemblies 110 that collect light from within the same or similar fields of view, or can be configured with a shared lens assembly 110 that directs light to the sensors 504, 508, and 512 via a beam splitter arrangement. In accordance with embodiments of the present disclosure, the number of pixels 310 included in the sensors 504, 508, and 512 can be equal to one another. Moreover, the area of the pixels 310 included in the sensors 504, 508, and 512 can all be the same. Alternatively, the sensors 504, 508, and 512 can have different numbers of pixels 310 and/or pixel 310 areas. For example, the image sensor 200 can include a EBS sensor 504 having a relatively low number of event detection pixels 604 and/or a ToF sensor 508 having a relatively low number of ToF pixels 608, thereby providing a relatively low resolution, and an imaging sensor 540 having a relatively high number of image sensing pixels 502, thereby providing a relatively high resolution. In accordance with at least some embodiments of the present disclosure, the image sensors 504, 508, and 512 can be operated simultaneously. In accordance with still other embodiments of the present disclosure, event detection operations can be performed continuously.

Figure 6B:
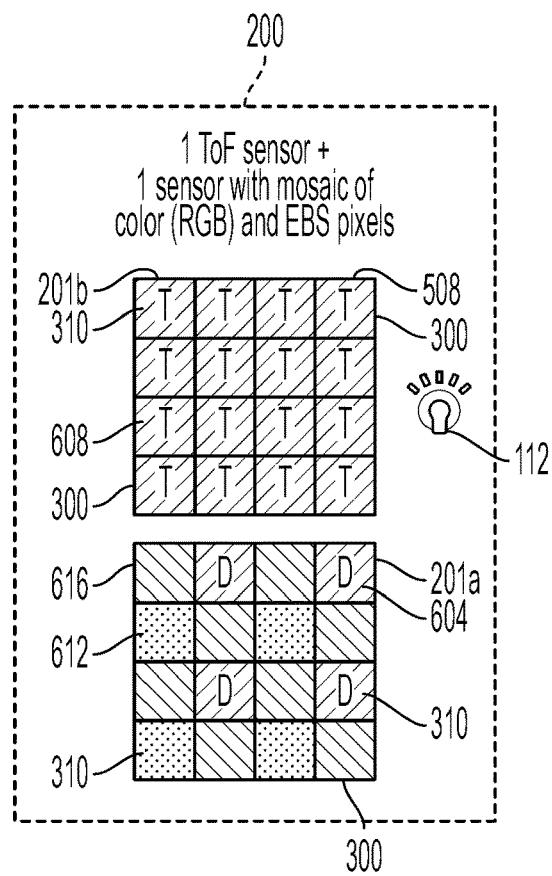
FIG. 6B illustrates aspects of sensors of a sensor system in accordance with other embodiments of the present disclosure.

FIG. 6B depicts an image sensor 200 with an array 300 of event detection 604 and image sensing 612 pixels on a first substrate 201a, forming a combined or shared event detection and image sensing sensor 616; and with ToF pixels 608 formed on a second substrate 201b as part of a ToF sensor 508. In the illustrated example, the majority of the unit pixels 310 of the combined event detection and image sensing sensor 616 are in the form of image sensing pixels 612, with a smaller number of event detection pixels 604 disposed amongst the image sensing pixels 612. However, a combined event detection and image sensing sensor 616 can include the same number of pixels 604 and 612, or can have more event detection pixels 604 than image sensing pixels 612. In addition, the number of ToF pixels 608 can be the same or different than one or both of the other types of pixels 604 and 612. The sensors 508 and 616 can operate in connection with shared or separate lens assemblies 110. In accordance with at least some embodiments of the present disclosure, the combined event detection and image sensing sensor 616 and the ToF sensor 508 can be operated simultaneously. Moreover, in accordance with at least some embodiments of the present disclosure, event detection 604 and image sensing 612 pixels of the combined event detection and image sensing sensor 616 can be operated simultaneously. In accordance with still other embodiments of the present disclosure, event detection operations can be performed continuously.

Figure 6C:
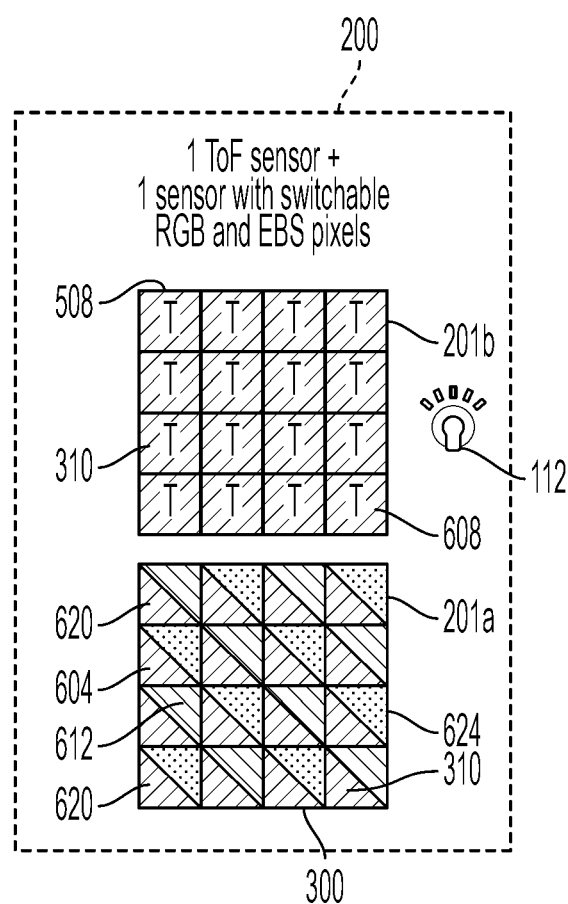
FIG. 6C illustrates aspects of sensors of a sensor system in accordance with other embodiments of the present disclosure.

FIG. 6C depicts an image sensor 200 with an array 300 of shared event detection and image sensing pixels 620 on a first substrate 201a, forming a combined or shared event detection and image sensing sensor 624; and with ToF pixels 608 formed on a second substrate 201b as part of a ToF sensor 508. More particularly, the shared event detection and image sensing sensor 624 includes pixels 310 in which event detection pixels 604 and image sensing pixels 612 each share a photoelectric conversion element, and thus constitute shared event detection and image sensing pixels 620. In the illustrated example, all of the unit pixels 310 of the shared event detection and image sensing sensor 624 are in the form of shared event detection and image sensing pixels 620. However, other configurations are possible. For example, event detection pixels 604, image sensing pixels 612, or both event detection 604 and image sensing 612 pixels, each having their own of photoelectric conversion element, can be included in the array 300 of the shared event detection and image sensing sensor 624. In addition, the number of ToF pixels 608 of the ToF sensor 508 can be the same or different than one or both of the pixels 310 of the shared event detection and image sensing sensor 624. The sensors 508 and 624 can operate in connection with shared or separate lens assemblies 110. In accordance with at least some embodiments of the present disclosure, the combined event detection and image sensing sensor 616 and the ToF sensor 508 can be operated simultaneously. In accordance with at least some embodiments of the present disclosure, event detection operations can be performed continuously.

Figure 6D:
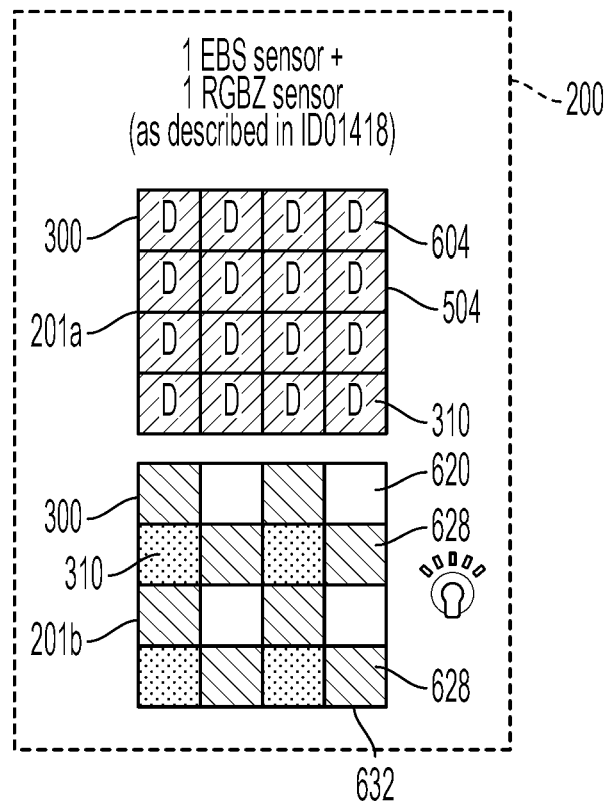
FIG. 6D illustrates aspects of sensors of a sensor system in accordance with other embodiments of the present disclosure.

FIG. 6D depicts an image sensor 200 having a first or EBS sensor 504, which includes an array 300 of pixels 310 in the form of address event detection pixels 604 disposed on a first light receiving chip or substrate 201a; and having an array of unit pixels 310, referred to herein as dual mode pixels 628, that function in a first mode as ToF pixels 608 and that function in a second mode as image sensing pixels 612 formed on a second light receiving chip or substrate 201b, forming a combined or shared EBS and imaging sensor 632. The dual mode pixels 628 can be disposed in groups configured as Bayer arrays. In accordance with at least some embodiments of the present disclosure, the shared EBS and imaging sensor 632 can include or be associated with a mechanically deployed IR cut filter for use during imaging operation. In accordance with at least some embodiments of the present disclosure, event detection and image sensing operations can be performed simultaneously. Moreover, in accordance with embodiments of the present disclosure, event detection operations can be performed continuously.

Figure 6E:
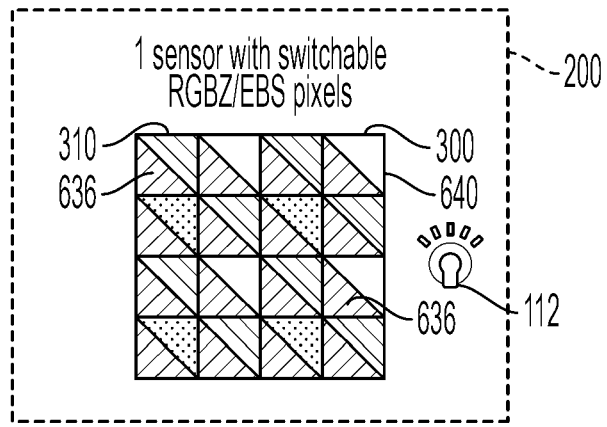
FIG. 6E illustrates aspects of a sensor of a sensor system in accordance with other embodiments of the present disclosure.

FIG. 6E depicts an image sensor 200 having an array of unit pixels 310, referred to herein as tri-mode pixels 636, that function in a first mode as EBS pixels 604, that function in a second mode as ToF pixels 608, and that function in a third mode as image sensing pixels 612 formed on a first (i.e. on the same) substrate 201, forming a tri-mode image sensor 640. The operating mode of the tri-mode pixels 636 can thus be switched to a selected operating mode. In accordance with at least some embodiments of the present disclosure, different tri-mode pixels 636 can be operated in different modes simultaneously. In accordance with further embodiments of the present disclosure, event detection operations can be performed continuously.

Figure 7A:
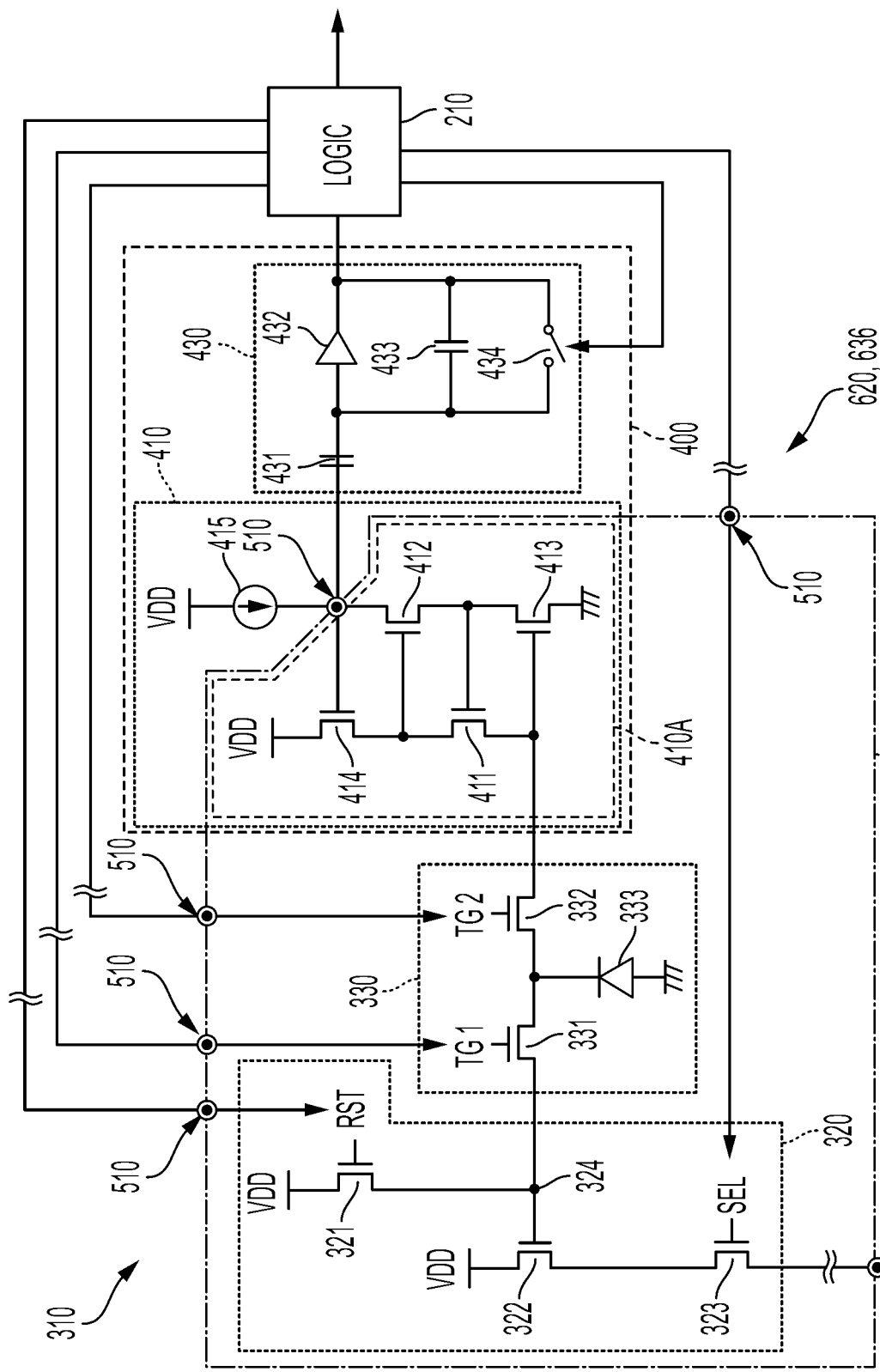
FIG. 7A is a circuit diagram illustrating a schematic configuration example of a unit pixel with combined event detection and image sensor functions in accordance with embodiments of the present disclosure.

Next, a configuration example of a unit pixel 310 will be described. FIG. 7A is a circuit diagram illustrating a schematic configuration example of a unit pixel 310 according to at least some embodiments of the present disclosure in which the pixel is configured as a combined or shared event detection (EBS) and image sensor (IS) pixel 620 that performs both event detection and image sensor functions. In accordance with further embodiments of the present disclosure, the unit pixel 310 illustrated in FIG. 7A is an example of a tri-mode pixel 636. For example, the pixel can be operated to determine a time of flight of light output by a light source 112.

As illustrated in FIG. 7A, the unit pixel 310 includes, for example, a pixel imaging signal generation unit (or readout circuit) 320, a light-receiving unit 330, and an address event detection unit (or readout circuit) 400. According to at least one example embodiment, the event detection readout circuit 400 can trigger operation of the image signal generation readout circuit 320 based on charge generated by a photoelectric conversion element (or photoelectric conversion region) 333 and based on operation of the logic circuit 210. The logic circuit 210 in FIG. 7A is a logic circuit including, for example, the drive circuit 211, the signal processor 212, and the arbiter 213 in FIG. 3. In accordance with at least some embodiments of the present disclosure, the logic circuit 210 can be implemented in the processor system 130. As described in greater detail elsewhere herein, the logic circuit 210 can make determinations as to whether to trigger operation of the image signal generation readout circuit 320 or the operation of image signal generation circuits 320 associated with other unit pixels 310 based on the output of the event detection readout circuit 400 or the output of other event detection readout circuits 400.

For example, the light-receiving unit 330 includes a first or imaging transmission transistor or gate (first transistor) 331, a second or address event detection transmission transistor or gate (second transistor) 332, and a photoelectric conversion element 333. A first transmission or control signal TG1 transmitted from the drive circuit 211 is selectively supplied to a gate of the first transmission transistor 331 of the light-receiving unit 330, and a second transmission or control signal TG2 transmitted from the drive circuit 211 is selectively supplied to a gate of the second transmission transistor 332. An output through the first transmission transistor 331 of the light-receiving unit 330 is connected to the pixel imaging signal generation unit 320, and an output through the second transmission transistor 332 is connected to the address event detection unit 400.

The pixel imaging signal generation unit 320 can include a reset transistor (third transistor) 321, an amplification transistor (fourth transistor) 322, a selection transistor (fifth transistor) 323, and a floating diffusion layer (FD) 324.

In accordance with at least some embodiments of the present disclosure, the first transmission transistor 331 and the second transmission transistor 332 of the light-receiving unit 330 are constituted, for example, by using an N-type metal-oxide-semiconductor (MOS) transistor (hereinafter, simply referred to as "NMOS transistor"). Similarly, the reset transistor 321, the amplification transistor 322, and the selection transistor 323 of the pixel imaging signal generation unit 320 are each constituted, for example, by using the NMOS transistor.

The address event detection unit 400 can include a current-voltage conversion unit 410 and a subtractor 430. The address event detection unit 400 can further be provided with a buffer, a quantizer, and a transmission unit. Details of the address event detection unit 400 will be described in the following description in connection with FIG. 8.

In the illustrated configuration, the photoelectric conversion element 333 of the light-receiving unit 330 photoelectrically converts incident light to generate a charge. The first transmission transistor 331 transmits a charge generated in the photoelectric conversion element 333 to the floating diffusion layer 324 of the image signal generation readout circuit 320 in accordance with the first control signal TG1. The second transmission transistor 332 supplies an electric signal (photocurrent) based on the charge generated in the photoelectric conversion element 333 to the address event detection unit 400 in accordance with the second control signal TG2.

When an instruction for image sensing is given by the processor system 130, the drive circuit 211 in the logic circuit 210 outputs the control signal TG1 for setting the first transmission transistor 331 of the light-receiving unit 330 of selected unit pixels 310 in the pixel array 300 to an ON-state. With this arrangement, a photocurrent generated in the photoelectric conversion element 333 of the light-receiving unit 330 is supplied to the pixel imaging signal generation readout circuit 320 through the first transmission transistor 331. More particularly, the floating diffusion layer 324 accumulates charges transmitted from the photoelectric conversion element 333 through the first transmission transistor 331. The reset transistor 321 discharges (initializes) the charges accumulated in the floating diffusion layer 324 in accordance with a reset signal transmitted from the drive circuit 211. The amplification transistor 322 allows a pixel signal of a voltage value corresponding to an amount of charge accumulated in the floating diffusion layer 324 to appear in a vertical signal line VSL. The selection transistor 323 switches a connection between the amplification transistor 322 and the vertical signal line VSL in accordance with a selection signal SEL transmitted from the drive circuit 211. Furthermore, the analog pixel signal that appears in the vertical signal line VSL is read out by the column ADC 220, and is converted into a digital pixel signal.

When an instruction for address event detection initiation is given by the processor system 130, the drive circuit 211 in the logic circuit 210 outputs the control signal for setting the second transmission transistor 332 of the light-receiving unit 330 in the pixel array unit 300 to an ON-state. With this arrangement, a photocurrent generated in the photoelectric conversion element 333 of the light-receiving unit 330 is supplied to the address event detection unit 400 of each unit pixel 310 through the second transmission transistor 332.

When detecting address event ignition on the basis of the photocurrent from the light-receiving unit 330, the address event detection unit 400 of each unit pixel 310 outputs a request to the arbiter 213. With respect to this, the arbiter 213 arbitrates the request transmitted from each of the unit pixels 310, and transmits a predetermined response to the unit pixel 310 that issues the request on the basis of the arbitration result. The unit pixel 310 that receives the response supplies a detection signal indicating the existence or nonexistence of the address event ignition (hereinafter, referred to as "address event detection signal") to the drive circuit 211 and the signal processor 212 in the logic circuit 210.

The drive circuit 211 can also set the second transmission transistor 332 in the unit pixel 310 that is a supply source of the address event detection signal to an OFF-state. With this arrangement, a supply of the photocurrent from the light-receiving unit 330 to the address event detection unit 400 in the unit pixel 310 is stopped.

Next, the drive circuit 211 sets the first transmission transistor 331 in the light-receiving unit 330 of the unit pixel 310 to an ON-state by the transmission signal TG1. With this arrangement, a charge generated in the photoelectric conversion element 333 of the light-receiving unit 330 is transmitted to the floating diffusion layer 324 through the first transmission transistor 331. In addition, a pixel signal of a voltage value corresponding to a charge amount of charges accumulated in the floating diffusion layer 324 appears in the vertical signal line VSL that is connected to the selection transistor 323 of the pixel imaging signal generation unit 320.

As described above, in the image sensor 200, a pixel signal SIG is output from the unit pixel 310 in which the address event ignition is detected to the column ADC 220. In accordance with further embodiments of the present disclosure, a pixel signal is output from the unit pixels 310 within a group or sub array of unit pixels 310 associated with the address of the unit pixel 310 from which an address event detection signal has been provided.

Furthermore, for example, the light-receiving unit 330, the pixel imaging signal generation unit 320, and two log (LG) transistors (sixth and seventh transistors) 411 and 414 and two amplification transistors (eighth and ninth transistors) 412 and 413 in the current-voltage conversion unit 410 of the address event detection unit 400 are disposed, for example, in the light-receiving chip 201 illustrated in FIG. 2, and other components can be disposed, for example, in the logic chip 202 that is joined to the light-receiving chip 201 through the Cu—Cu joining. Therefore, in the following description, in the unit pixel 310, configurations which are disposed in the light-receiving chip 201 are referred to as "upper layer circuit".

Figure 7B:
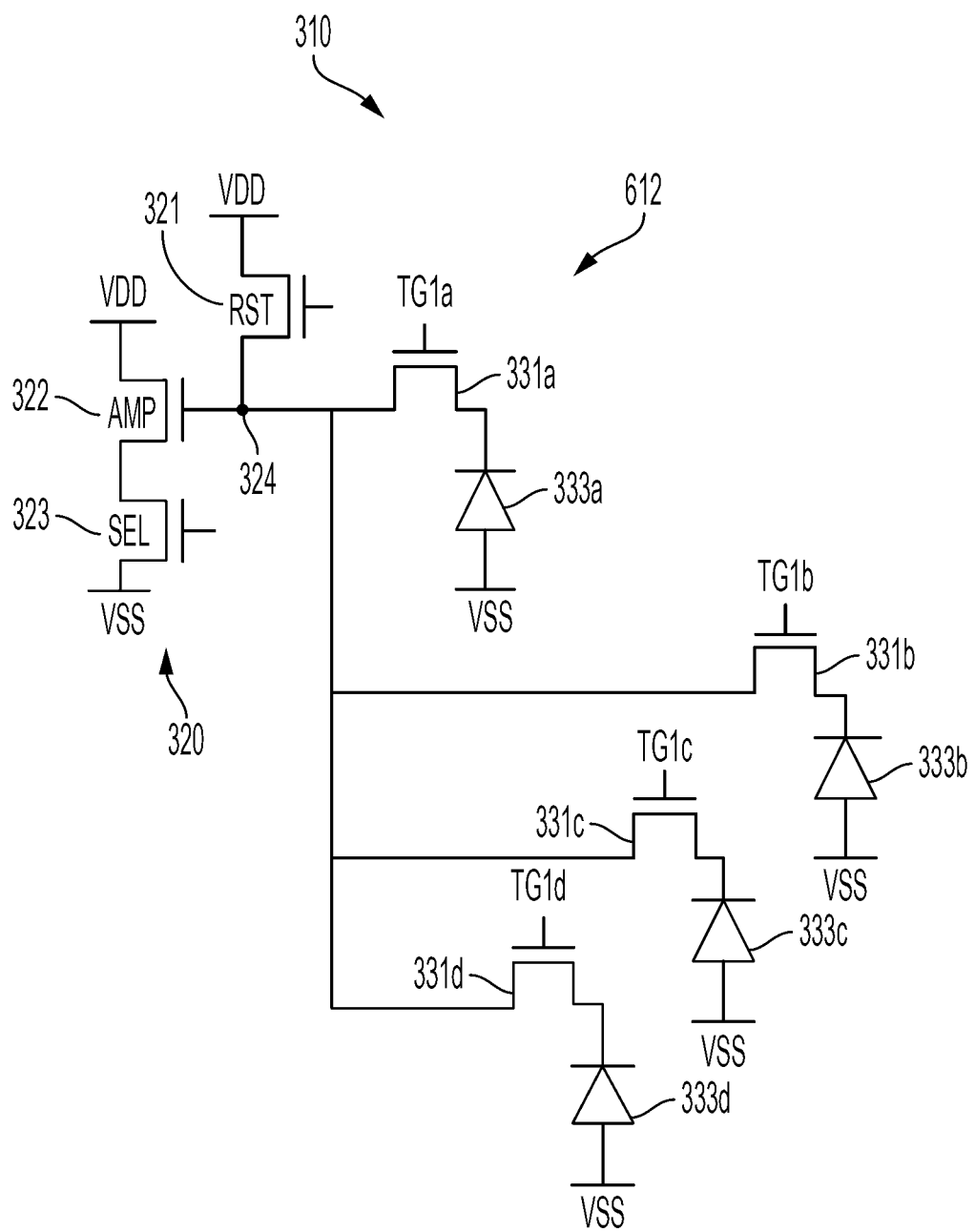
FIG. 7B is a circuit diagram illustrating a schematic configuration example of a group of image sensing pixels in accordance with embodiments of the present disclosure.

A configuration example of a group of unit pixels 310 configured as image sensing pixels 612 with shared pixel imaging signal generation readout circuity 320 in accordance with at least some embodiments of the present disclosure is depicted in FIG. 7B. In this example, each photoelectric conversion element 333 is selectively connected to the floating diffusion 324 via a respective transfer gate 331. In addition, the components of the pixel imaging signal readout circuit 320 are shared by the photoelectric conversion units 333. In this example, three photoelectric conversion units 333a-333d, and three corresponding transfer gates 331a-331d, are shown. However, any number of photoelectric conversion units 333 and respective transfer gates 331 can be included in connection with a shared pixel imaging signal readout circuit 320.

Figure 7C:
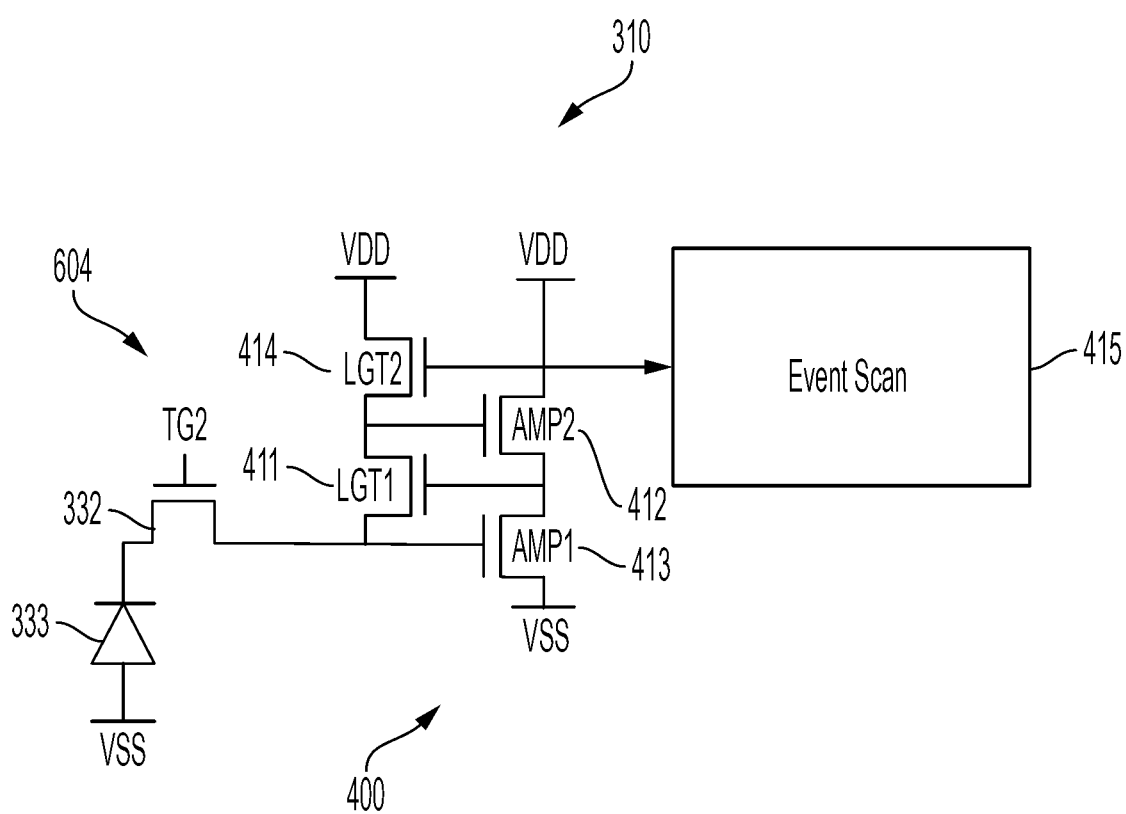
FIG. 7C is a circuit diagram illustrating a schematic configuration example of an event detection pixel in accordance with embodiments of the present disclosure.

A configuration example of a unit pixel 310 configured as a single function address event detection pixel 604 and associated address event detection readout circuit 400 elements is depicted in FIG. 7C. As shown, this example includes a single photoelectric conversion element 333 selectively connected by a transfer gate 332 to components of an address event detection readout circuit 400. An event scan control block 415 controls operation of the address event detection readout circuit 400.

Figure 7D:
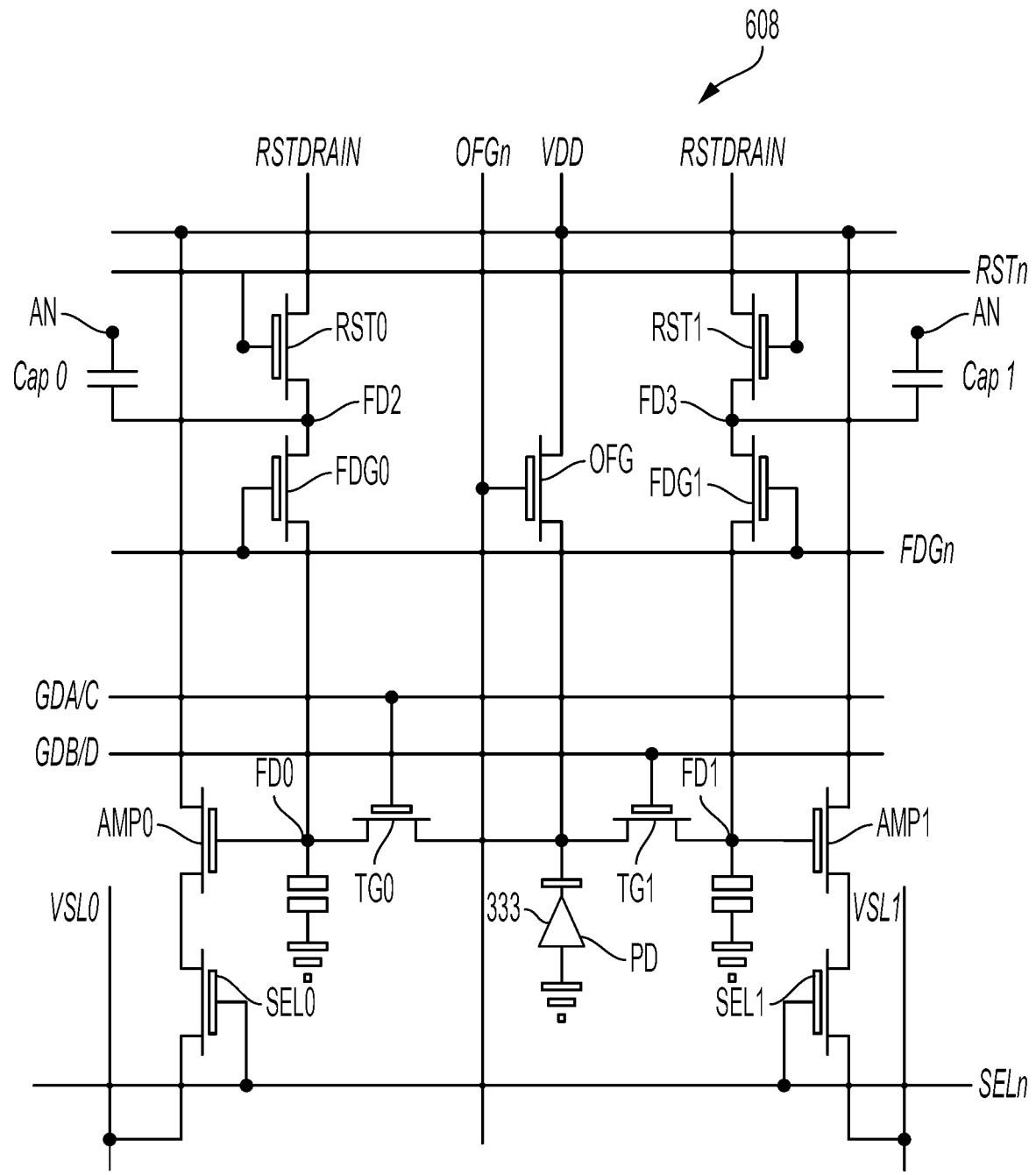
FIG. 7D is a circuit diagram illustrating a schematic configuration example of a ToF pixel in accordance with embodiments of the present disclosure.

A configuration example of a unit pixel 310 configured as a ToF pixel 608 and associated ToF readout circuit 700 elements are depicted in FIG. 7D. More particularly, this example ToF pixel 608 is configured as an indirect ToF pixel. The pixel 608 includes a photoelectric conversion region (PD) 333, such as a photodiode or other light sensor, transfer transistors TG0 and TG1, floating diffusion regions FD0 and FD1, reset transistors RST0 and RST1, amplification transistors AMP0 and AMP1, and selection transistors SEL0 and SEL1. The pixel 608 may further include an overflow transistor OFG, transfer transistors FDG0 and FDG1, and floating diffusion regions FD2 and FD3.

Figure 8:
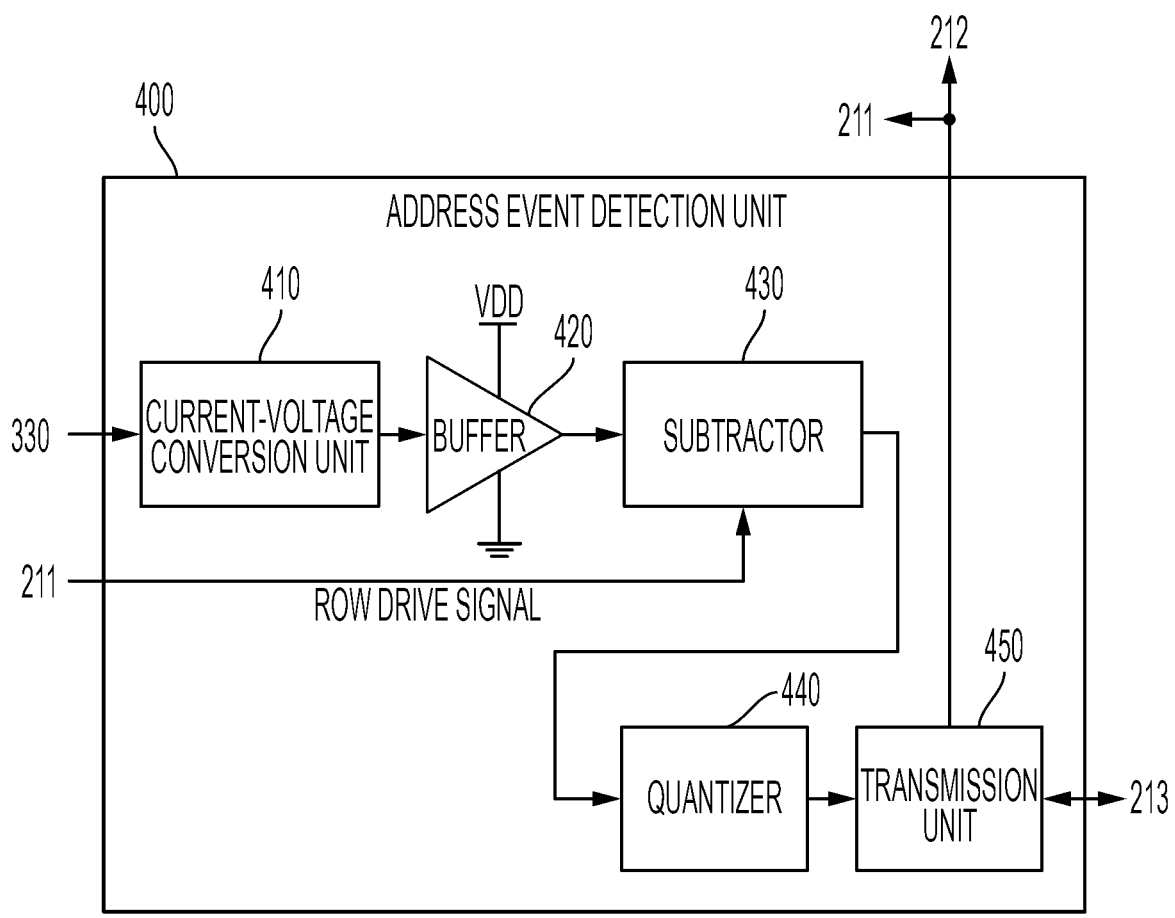
FIG. 8 is a block diagram illustrating a configuration example of an address event detection unit in accordance with embodiments of the present disclosure.

FIG. 8 is a block diagram illustrating a schematic configuration example of the address event detection unit 400 according to at least some embodiments of the present disclosure. As illustrated in FIG. 8, the address event detection unit 400 includes a current-voltage conversion unit 410, a buffer 420, a subtractor 430, a quantizer 440, and a transmission unit 450. The current-voltage conversion unit 410 converts the photocurrent from the light-receiving unit 330 into a voltage signal, and supplies the voltage signal generated through the conversion to the buffer 420. The buffer 420 corrects the voltage signal transmitted from the current-voltage conversion unit 410, and outputs a voltage signal after correction to the subtractor 430. The subtractor 430 lowers a voltage level of the voltage signal transmitted from the buffer 420 in accordance with a row drive signal transmitted from the drive circuit 211 and, supplies the lowered voltage signal to the quantizer 440. The quantizer 440 quantizes the voltage signal transmitted from the subtractor 430 into a digital signal, and outputs the digital signal generated through the quantization to the transmission unit 450 as a detection signal. The transmission unit 450 transmits the detection signal transmitted from the quantizer 440 to the signal processor 212 and the like. For example, when address event ignition is detected, the transmission unit 450 supplies a request for transmission of an address event detection signal from the transmission unit 450 to the drive circuit 211 and the signal processor 212 to the arbiter 213. In addition, when receiving a response with respect to the request from the arbiter 213, the transmission unit 450 supplies the detection signal to the drive circuit 211 and the signal processor 212.

The current-voltage conversion unit 410 in the configuration illustrated in FIG. 8 can include the two LG transistors 411 and 414, the two amplification transistors 412 and 413, and a constant-current circuit 415 as illustrated in FIG. 6A. For example, a source of the LG transistor 411 and a gate of the amplification transistor 413 are connected to a drain of the second transmission transistor 332 of the light-receiving unit 330. In addition, for example, a drain of the LG transistor 411 is connected to a source of the LG transistor 414 and a gate of the amplification transistor 412. For example, a drain of the LG transistor 414 is connected to a power supply terminal VDD. In addition, for example, a source of the amplification transistor 413 is grounded, and a drain thereof is connected to a gate of the LG transistor 411 and a source of the amplification transistor 412. For example, a drain of the amplification transistor 412 is connected to a power supply terminal VDD through the constant-current circuit 415. For example, the constant-current circuit 415 is constituted by a load MOS transistor such as a p-type MOS transistor. In this connection relationship, a loop-shaped source follower circuit is constructed. With this arrangement, a photocurrent from the light-receiving unit 330 is converted into a voltage signal in a logarithmic value corresponding to a charge amount thereof. Furthermore, the LG transistors 411 and 414, and the amplification transistors 412 and 413 may be each constituted, for example, by an NMOS transistor.

Figure 9:
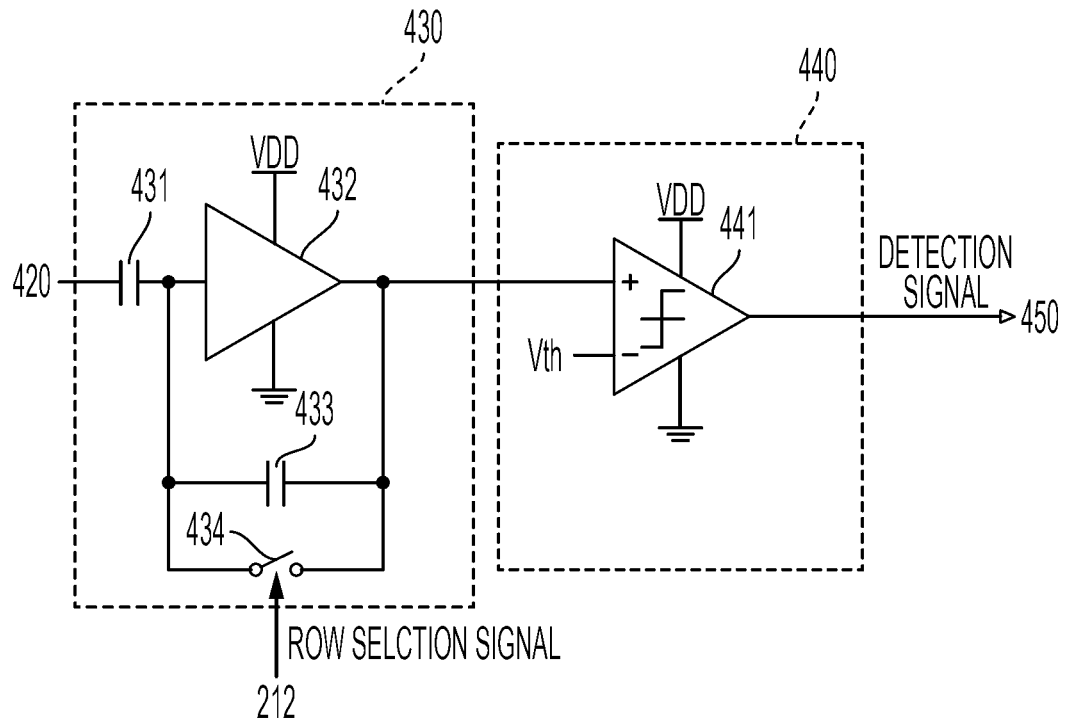
FIG. 9 is a circuit diagram illustrating a configuration example of a subtractor and a quantizer in accordance with embodiments of the present disclosure.

FIG. 9 is a circuit diagram illustrating a schematic configuration example of the subtractor 430 and the quantizer 440 according to at least some embodiments of the present disclosure. As illustrated in FIG. 9, the subtractor 430 includes capacitors 431 and 433, an inverter 432, and a switch 434. In addition, the quantizer 440 includes a comparator 441. One end of the capacitor 431 is connected to an output terminal of the buffer 420, and the other end is connected to an input terminal of the inverter 432. The capacitor 433 is connected to the inverter 432 in parallel. The switch 434 opens or closes a route connecting both ends of the capacitor 433 in accordance with a row drive signal. The inverter 432 inverts a voltage signal that is input through the capacitor 431. The inverter 432 outputs an inverted signal to a non-inverting input terminal (+) of the comparator 441. When the switch 434 is turned on, a voltage signal Vinit is input to a buffer 420 side of the capacitor 431. In addition, the opposite side becomes a virtual ground terminal. A potential of the virtual ground terminal is set to zero for convenience. At this time, when a capacity of the capacitor 431 is set as C1, a potential Qinit that is accumulated in the capacitor 431 is expressed by the following Expression (1). On the other hand, both ends of the capacitor 433 are short-circuited, and thus an accumulated charge thereof becomes zero.

$$Q\text{init} = C1 \times V\text{init} \quad (1)$$

Next, when considering a case where the switch 434 is turned off, and a voltage of the capacitor 431 on the buffer 420 side varies and reaches Vafter, a charge Qafter accumulated in the capacitor 431 is expressed by the following Expression (2).

$$Q\text{after} = C1 \times V\text{after} \quad (2)$$

On the other hand, when an output voltage is set as Vout, a charge Q2 accumulated in the capacitor 433 is expressed by the following Expression (3).

$$Q2 = -C2 \times V\text{out} \quad (3)$$

At this time, a total charge amount of the capacitors 431 and 433 does not vary, and thus the following Expression (4) is established.

$$Q\text{init} = Q\text{after} + Q2 \quad (4)$$

When Expression (1) to Expression (3) are substituted for Expression (4), the following Expression (5) is obtained.

$$V\text{out} = -(C1/C2) \times (V\text{after} - V\text{init}) \quad (5)$$

Expression (5) represents a subtraction operation of a voltage signal, and a gain of the subtraction result becomes C1/C2. Typically, it is desired to maximize (or alternatively, improve) the gain, and thus it is preferable to make a design so that C1 becomes large and C2 becomes small. On the other hand, when C2 is excessively small, kTC noise increases, and thus there is a concern that noise characteristics deteriorate. Accordingly, a reduction in the capacity of C2 is limited to a range capable of permitting noise. In addition, since the address event detection unit 400 including the subtractor 430 is mounted for every unit pixel 310, a restriction on an area is present in capacities C1 and C2. Values of the capacities C1 and C2 are determined in consideration of the restriction.

The comparator 441 compares a voltage signal transmitted from the subtractor 430 and a predetermined threshold voltage Vth that is applied to an inverting input terminal (−). The comparator 441 outputs a signal indicating the comparison result to the transmission unit 450 as a detection signal. In addition, when a conversion gain by the current-voltage conversion unit 410 is set as $CG_{log}$, and a gain of the buffer 420 is set to "1", a gain A of the entirety of the address event detection unit 400 is expressed by the following Expression (6).

[Math. 1]

$$A = \frac{CG_{log} \cdot C1}{C2} \sum_{n=1}^{N} i_{photo\_n} \quad (6)$$

In Expression (6), $i_{photo\_n}$ represents a photocurrent of an nth unit pixel 310, and a unit thereof is, for example, an ampere (A). N represents the number of the unit pixels 310 in a pixel block, and is "1" in this embodiment.

Figure 10:
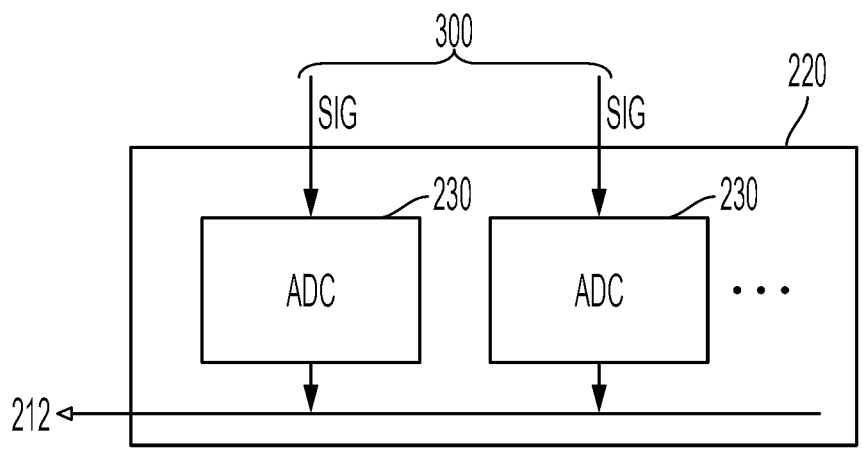
FIG. 10 is a block diagram illustrating a configuration example of a column ADC in accordance with embodiments of the present disclosure.

FIG. 10 is a block diagram illustrating a schematic configuration example of the column ADC according to at least some embodiments of the present disclosure. The column ADC 220 includes a plurality of ADCs 230 which are provided for every column of the unit pixels 310. Each of the ADCs 230 converts an analog pixel signal that appears in the vertical signal line VSL into a digital signal. For example, the pixel signal is converted into a digital signal in which a bit length is greater than that of a detection signal. For example, when the detection signal is set to two bits, the pixel signal is converted into a digital signal of three or greater bits (16 bits and the like). The ADC 230 supplies a generated digital signal to the signal processor 212.

Figure 11:
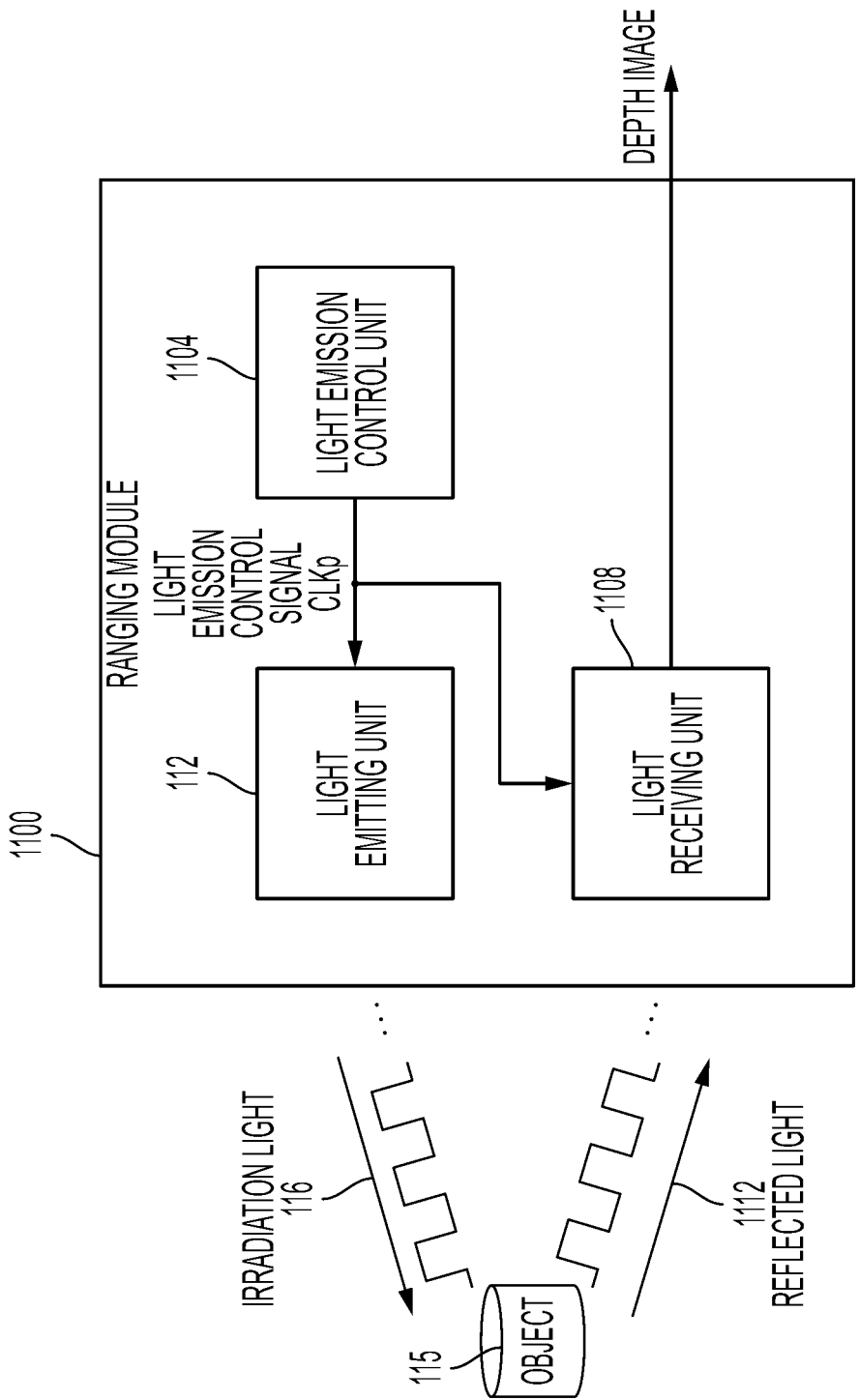
FIG. 11 is a block diagram illustrating a configuration example of ranging module for ToF sensing in accordance with embodiments of the present disclosure.

FIG. 11 is a block diagram illustrating a ranging module (or ranging device) 1100 that can be implemented by or included in a sensor system 100 that outputs distance measurement information in connection with a pixel array 300 that includes one or more ToF pixels 608, or shared pixels 628 or 636 with ToF capabilities according to at least one example embodiment.

The ranging module 1100 includes a light emitting unit (or light source) 112, a light emission control unit (or controller) 1104, and a light receiving unit 1108 that includes a pixel array 310. For implementing an indirect ToF (iToF) type ranging system, the light source 112 emits light having a predetermined wavelength, and irradiates the object with irradiation light 116 of which brightness periodically changes. For example, the light source 112 has a light emitting diode that emits infrared light having a wavelength in a range of 780 nm to 1000 nm as a light source, and generates the irradiation light in synchronization with a light emission control signal CLKp of a rectangular wave supplied from the light emission control unit 1104. Note that, the light emission control signal CLKp is not limited to the rectangular wave as long as the control signal CLKp is a periodic signal. For example, the light emission control signal CLKp may be a sine wave. For implementing direct ToF (dToF) type ranging system, the light source is controlled by the light emission control unit 1104 to emit a pulse of light at a known time. In at least some embodiments of the present disclosure, the light emission control unit 1104 is implemented by the processor system 130.

Pixels 310 within the pixel array 300 receive light 1112 that is reflected from the object 115, calculates the distance information for each ToF pixel according to a light reception result, generates a depth image in which the distance to the object is represented by a gradation value for each pixel, and outputs the depth image.

Figure 12A:
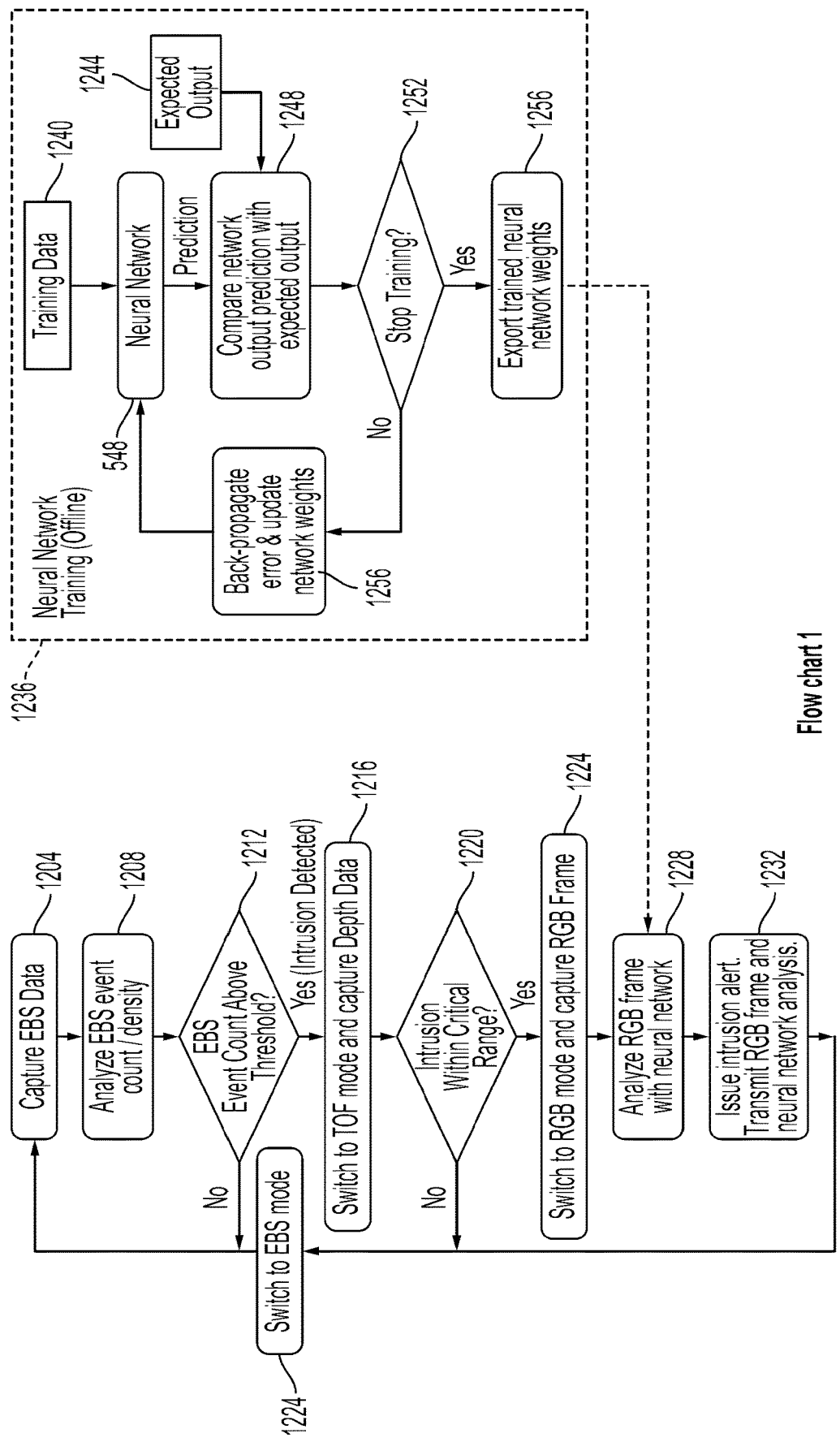
FIG. 12A is a flowchart depicting the operation of a sensor system in accordance with embodiments of the present disclosure.

FIG. 12A is a flowchart that illustrates aspects of the operation of a sensor system 100 in accordance with embodiments of the present disclosure. The operations discussed in connection with the flowchart will also be described with reference to FIG. 12B, which is a block diagram of a sensor system 100 suitable for implementing a sensor system 100 capable of performing the described operations. Although the sensor system 100 is illustrated in FIG. 12B as including separate EBS 504, ToF 508, and RGB 512 sensors, it should be appreciated that other sensor configurations and combinations, including sensors with shared or combined functionalities, can be used in place of or in addition to single functionality sensors. In connection with at least some implementations of the operations discussed in connection with FIG. 12A and other operational examples discussed herein, the sensor system 100 is operated to monitor a scene.

As depicted in FIG. 12A, operation of the sensor system 100 includes the capture of EBS data by pixels 604 included in the EBS sensor 504 (step 1204). The EBS data is passed by the output circuit 528 to the intrusion event detection function 540. In the intrusion event detection function 540, the EBS event count and density is analyzed (step 1208). For example, the number of events within a defined time frame, and/or within a selected area of the array 310 of dedicated 604 or shared 620 or 636 event detection pixels is analyzed. If, at step 1212, the number of events and/or density of events is determined to be below selected threshold values, the process returns to step 1204, and the operation of the EBS sensor 504 is continued, without triggering operation of the other sensors 508 and 512.

If, at step 1212, the number of events and or density of events is determined to be at or above selected threshold values, the intrusion event detection function 540 provides an intrusion event detection signal to the signal control bus 556. The intrusion event detection signal causes the ToF on/off logic 520 to switch on the time of flight sensor 508, thereby placing the sensor system 100 in a time of flight mode, in which depth data is acquired from the scene and captured (step 1216). As can be appreciated by one of skill in the art after consideration of the present disclosure, operation of the time of flight sensor 508 includes operation of the light source 112 that is used in connection with operation of the sensor 508 to obtain depth data from the scene. In accordance with embodiments of the present disclosure, operation of the EBS sensor 504 can continue while depth data is being captured by the TOF sensor 508. In accordance with other embodiments of the present disclosure, operation of the EBS sensor 504 can be discontinued while depth data is being captured by the TOF sensor 508.

At step 1220, a determination can be made as to whether an object 115 associated with the detected event is within a selected or critical range. Specifically, the selected or critical range refers to a distance between an object and a camera. This determination can be made by the intrusion distance analysis function 544 in response to an output from the output circuit 532. If the intruding object 115 is not within the critical range, operation of the sensor system 100 can be returned to the EBS mode (step 1224), and EBS data can continue to be collected (step 1204).

If, at step 1220, and object 115 associated with the detected event is within a selected or critical range, the intrusion distance analysis function 544 provides a signal to the signal control bus 556 that causes the sensor system 100 to switch to an imaging mode (i.e. RGB mode) (step 1224). In the RGB mode, the image information is captured. In accordance with embodiments of the present disclosure, switching to an imaging mode can include the on off logic 524 turning the imaging sensor 512 to an operational mode. The image information can include analyzing one or more frames of such information using a neural network 548 (step 1228). In response to the neural network 548 determining that an intrusion alert is warranted, an intrusion alert 552 is issued (step 1232). Together with the alert, one or more frames of image data and information regarding the analysis performed or the conclusion reached by the neural network 548 can be output.

As can be appreciated by one of skill in the art after consideration of the present disclosure, the neural network 548 performing intrusion analysis based on image frame data can be trained prior to deployment or operation of the neural network 548. As depicted in the training procedure 1236 portion of FIG. 12A, training can include feeding training data 1240 to the neural network 548. A prediction based on the received data and output by the neural network 548 is compared with an expected output 1244 (step 1248). At step 1252, a determination is made as to whether training can be stopped. If continued training is determined to be necessary or desirable, errors in the prediction made by the neural network 548 can be back propagated, and network weights can be updated (step 1256). The training process can then continue. If the neural network 548 is determined to be sufficiently trained, the trained neural network 548 network weights are exported and installed in the neural network 548 in the sensor system 100 (step 1256).

Figure 13A:
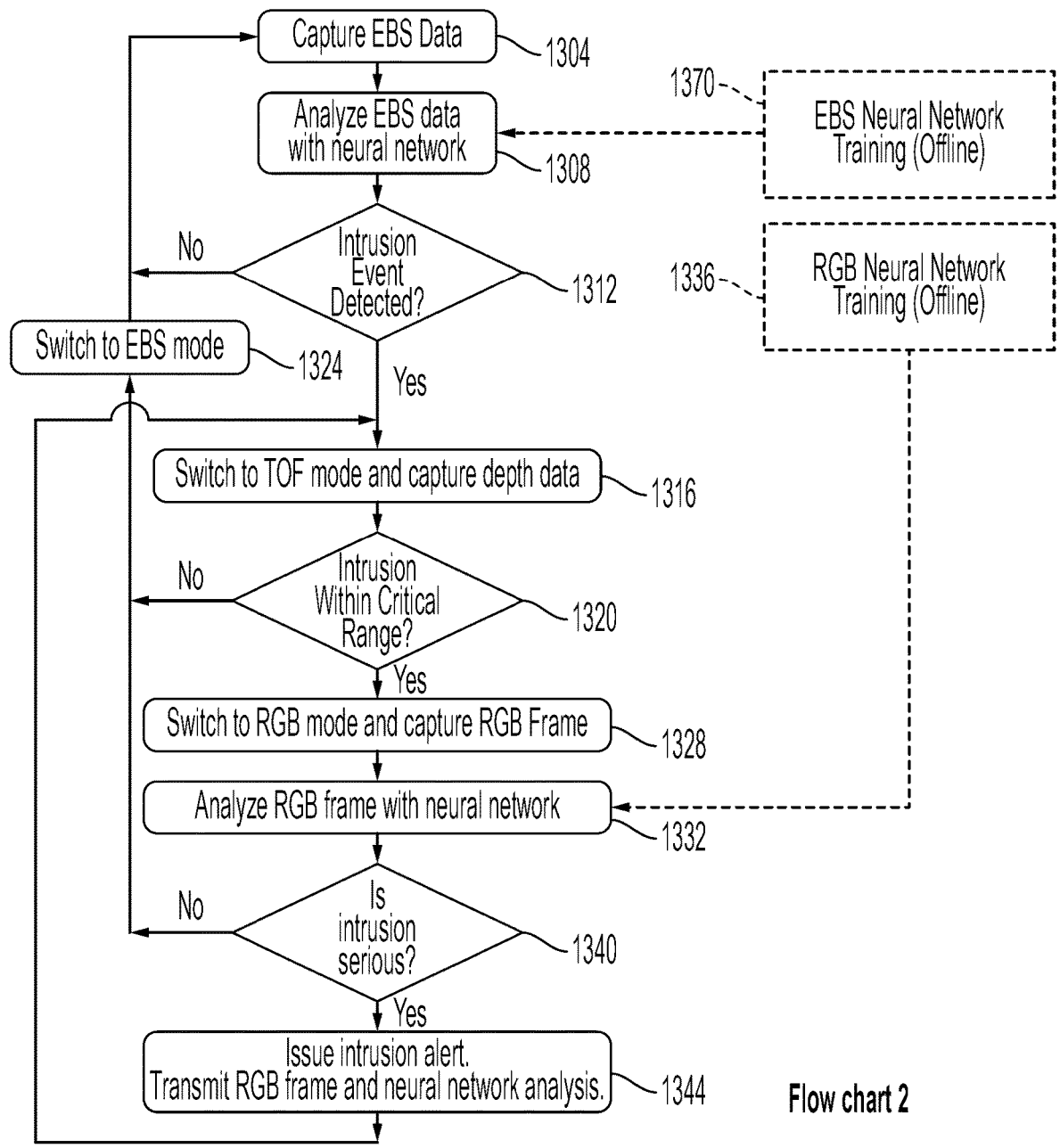
FIG. 13A is a flowchart depicting the operation of a sensor system in accordance with other embodiments of the present disclosure.
Figure 13B:
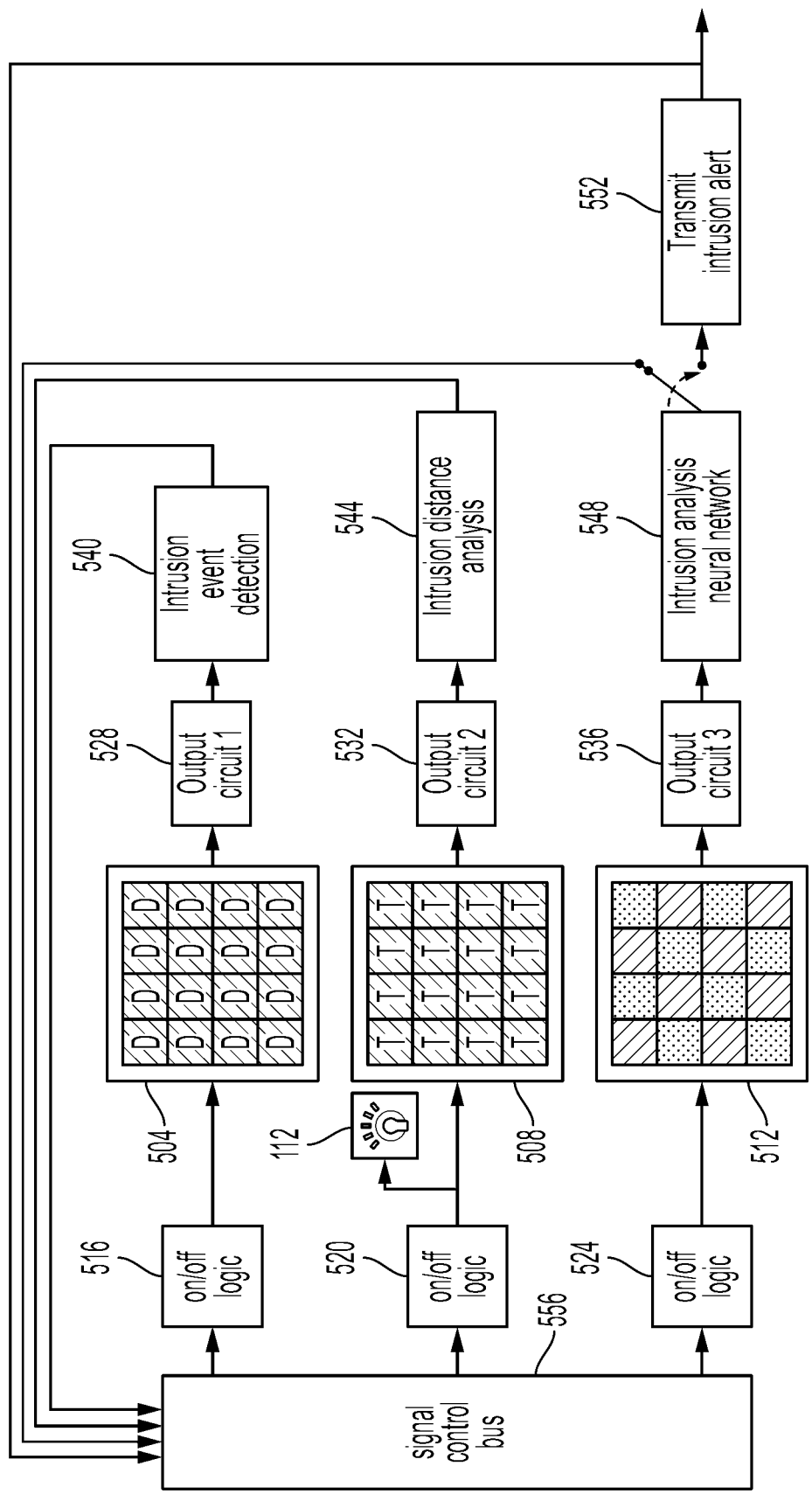
FIG. 13B is a block diagram of a sensor system configured to implement the operations of FIG. 13A.

FIG. 13A is a flowchart that illustrates other aspects of the operation of the sensor system 100 in accordance with embodiments of the present disclosure, and the operations illustrated therein will be described with reference to FIG. 13B, which is a block diagram of the sensor system 100 suitable for implementing the described operations. As with other illustrated embodiments, although the sensor system 100 is illustrated in FIG. 13B as including separate EBS 504, TOF 508, and RGB 512 sensors, it should be appreciated that other sensor configurations and combinations are possible. For example, sensors with combined or shared pixel functions can be utilized. Moreover, as in other embodiments, the sensor system 100 can be deployed to, for example, monitor a scene.

As depicted in FIG. 13A, the operation of the sensor system 100 includes the capture of EBS data by the EBS sensor 504 (step 1304). The captured data is then analyzed using an intrusion event detection function 540 implementing a neural network (step 1308). The neural network implemented by the intrusion event detection function 540 can be a network that is trained off-line (step 1310). For example, the neural network performing the intrusion detection function 540 in such embodiments can be trained to detect a pattern or sequence of events indicative of an intrusion. At step 1312, a determination is made as to whether the analysis of the EBS data has resulted in a determination that an intrusion event has been detected. If it is determined that an intrusion event has not been detected, EBS data can continue to be captured (step 1304).

If it is determined at step 1312 that an intrusion event has been detected, the sensor system 100 is switched to a time of flight mode (step 1316). In the time of flight mode, the light source 112 and TOF sensor 508 are operated to capture depth data from the scene. At step 1320, the collected depth data is analyzed to determine whether intrusion within a critical range has been detected. For example, a determination can be made as to whether an object 115 in an area of the scene corresponding to the area at which an intrusion event was determined to have occurred is within a critical range. If an intrusion within a critical range is not detected, the sensor system is switched to the EBS mode (step 1324). In particular, the EBS sensor 504 is switched on, and the time of flight sensor 508 and RGB sensor 512, previously activated, are turned off. In accordance with embodiments of the present disclosure that support simultaneous operation of the EBS sensor 504 and other sensors 508 and/or 512, the EBS sensor 504 can be operated continuously, in which case switching to EBS mode at step 1324 turns off the other modes, while continuing to operate the EBS sensor 504.

If an intrusion within a critical range is detected at step 1324, the sensor system 100 is switched to an imaging mode (step 1328). In addition to initiating the capture of imaging data, switching to the imaging mode can include turning off the EBS sensor 504 and/or the time of flight sensor 508 and light source 112. At step 1332, the image data obtained by the image sensor 512 is analyzed using an intrusion analysis neural network 548. The intrusion analysis neural network 548 can be trained (step 1336) as part of an off-line process. The analysis can include an analysis of one or more frames of captured image data. From the analysis, a determination can be made as to whether the intrusion is serious (step 1340). As examples, the intrusion analysis 548 can include object recognition processes capable of identifying a class or particular identity of an object 115, and from that identification determining whether an alert that the intrusion is serious should be issued.

If the intrusion is not determined to be a serious one, the sensor system 100 can be switched back to a EBS mode (step 1324). In addition to switching back to EBS mode, the image sensor 512, and/or the time of flight sensor 508 and light source 112 can be turned off. If the intrusion is determined to be a serious one, an intrusion alert 552 is issued (step 1344). The intrusion alert can include imaging frame data and data concerning the analysis performed by the intrusion analysis neural network 548. After issuing an intrusion alert, the process can continue to capture time of flight data (step 1316), and thereby determine whether the intruding object 115 remains within the critical range of the sensor system 100. Accordingly, if the object 115 is no longer within the critical range, the sensor system 100 can return to the EBS mode. Alternatively, if the object number 115 continues to be within the critical range, operation of the image sensor 512 can continue, and the collection and analysis of image data frames can continue.

Figure 14A:
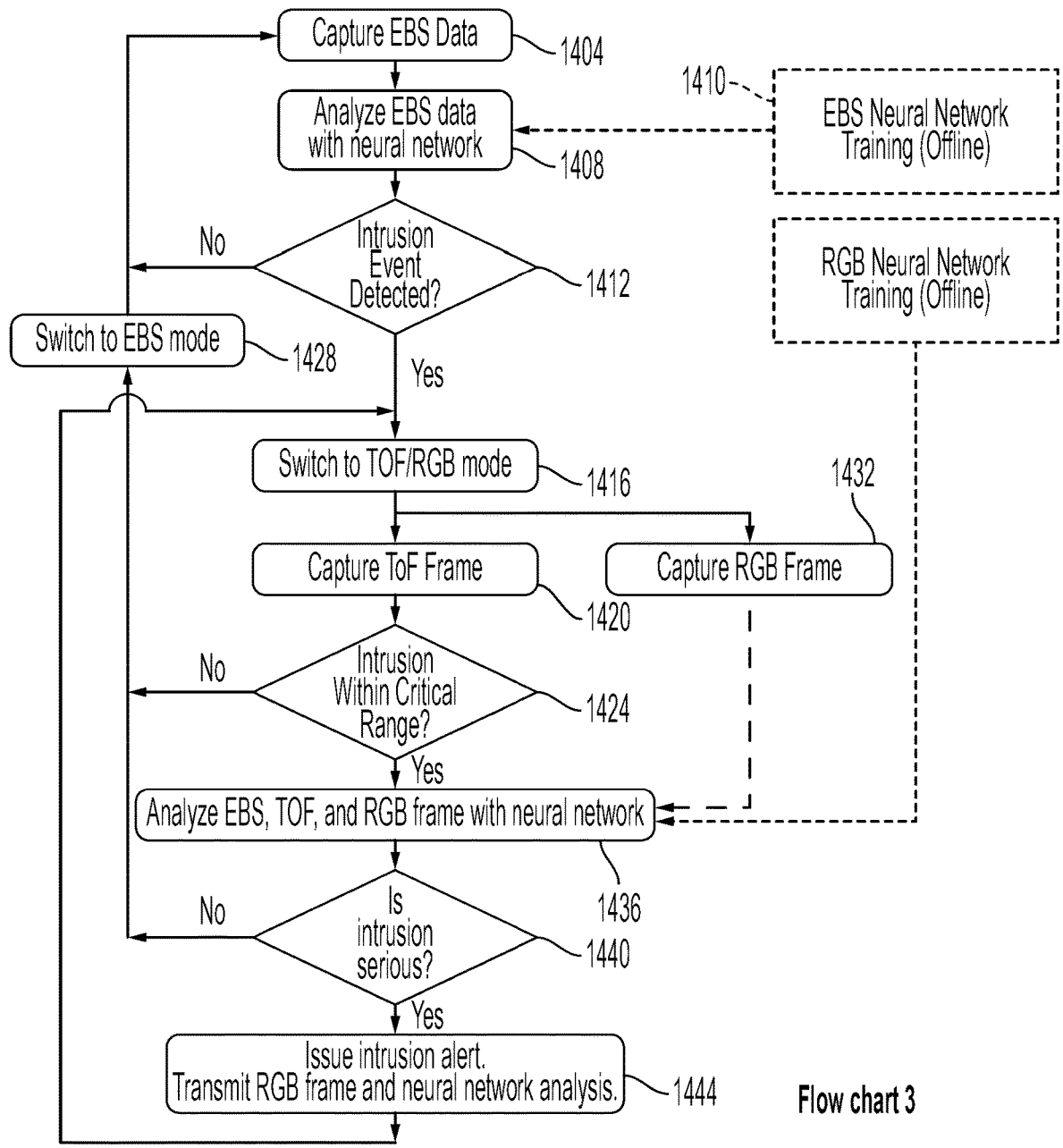
FIG. 14A is a flowchart depicting the operation of a sensor system in accordance with other embodiments of the present disclosure.
Figure 14B:
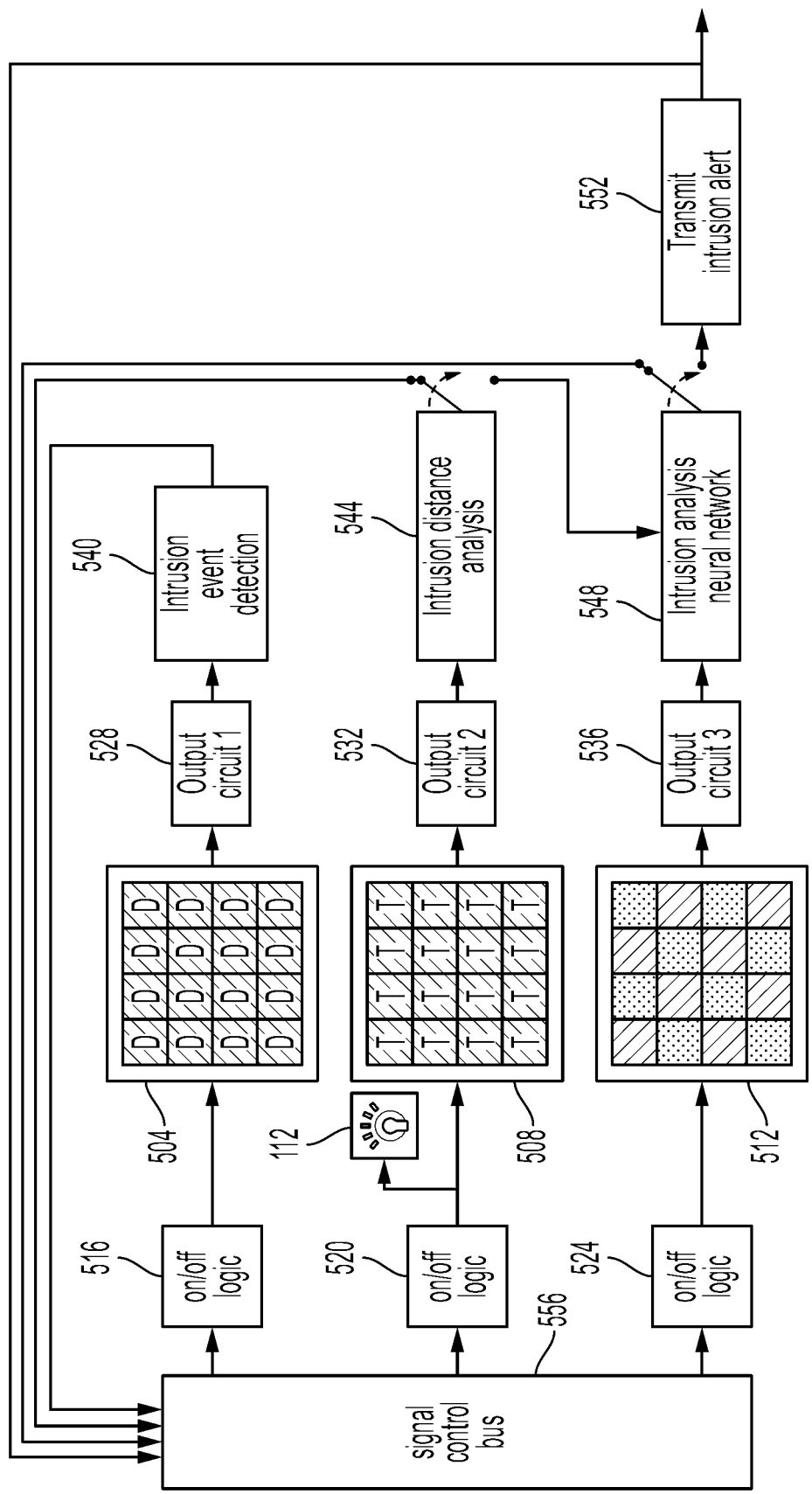
FIG. 14B is a block diagram of a sensor system configured to implement the operations of FIG. 14A.

FIG. 14A is a flowchart that illustrates other aspects of the operation of the sensor system 100 in accordance with embodiments of the present disclosure, and the operations illustrated therein will be described with reference to FIG. 14B, which is a block diagram of the sensor system 100 suitable for implementing the described operations. As with other illustrated embodiments, although the sensor system 100 is illustrated in FIG. 14B as including separate EBS 504, TOF 508, and RGB 512 sensors, it should be appreciated that other sensor configurations and combinations are possible. For example, sensors with combined or shared pixel functions can be utilized. Moreover, as in other embodiments, the sensor system 100 can be deployed to, for example, monitor a scene.

As depicted in FIG. 14A, the operation of the sensor system 100 includes the capture of EBS data by the EBS sensor 504 (step 1404). The captured data is then analyzed using an intrusion event detection function 540 implementing a neural network (step 1408). As in at least some other embodiments, the neural network implemented by the intrusion event detection function 540 can be a network that is trained off-line (step 1410). At step 1412, a determination is made as to whether the analysis of the EBS data has resulted in a determination that an intrusion event has been detected. If it is determined that an intrusion event has not been detected, EBS data can continue to be captured (step 1404).

If it is determined at step 1412 that an intrusion event has been detected, the sensor system 100 is switched to a simultaneous time of flight and imaging mode, where both the TOF sensor 508 and imaging sensor 512 are operational (step 1416). As can be appreciated by one of skill in the art after consideration of the present disclosure, the sensor system 100 must therefore include TOF 508 and imaging 512 sensors that can be operated simultaneously. Data collected by the TOF sensor 508 (step 1420) is analyzed to determine whether an intrusion is within a critical range (step 1424). In response to a determination that an object 115 associated with an intrusion is not within the critical range, the sensor system 100 can be switched to a EBS only mode (step 1428). In response to a determination that an object number 115 associated with an intrusion is within the critical range, the collected data can be supplied to the intrusion analysis neural network 548. In addition, data captured by the imaging sensor 512 (step 1432) can be supplied to the intrusion analysis neural network 548.

At step 1436, the intrusion analysis neural network 548 analyzes the EBS, ToF and image frame data. This analysis can include object identification or classification based on the EBS, ToF and/or imaging data. Based on the analysis by the neural network 548, a determination is made as to whether the intrusion is serious (step 1440). In response to a determination that the intrusion is not serious, the time of flight 508 and imaging 512 sensors are turned off, and the sensor system 100 is returned to a EBS mode (step 1428). If it is determined that the intrusion is serious, an intrusion alert is issued (step 1444). The intrusion alert can include transmitting image frame data and neural network analysis information as part of a transmitted intrusion alert 552. After transmitting an intrusion alert 552, the process can return to step 1416, and time of flight and image data can continue to be collected and analyzed until the intrusion is determined to be no longer present within the critical range or is determined to be no longer serious.

Figure 15A:
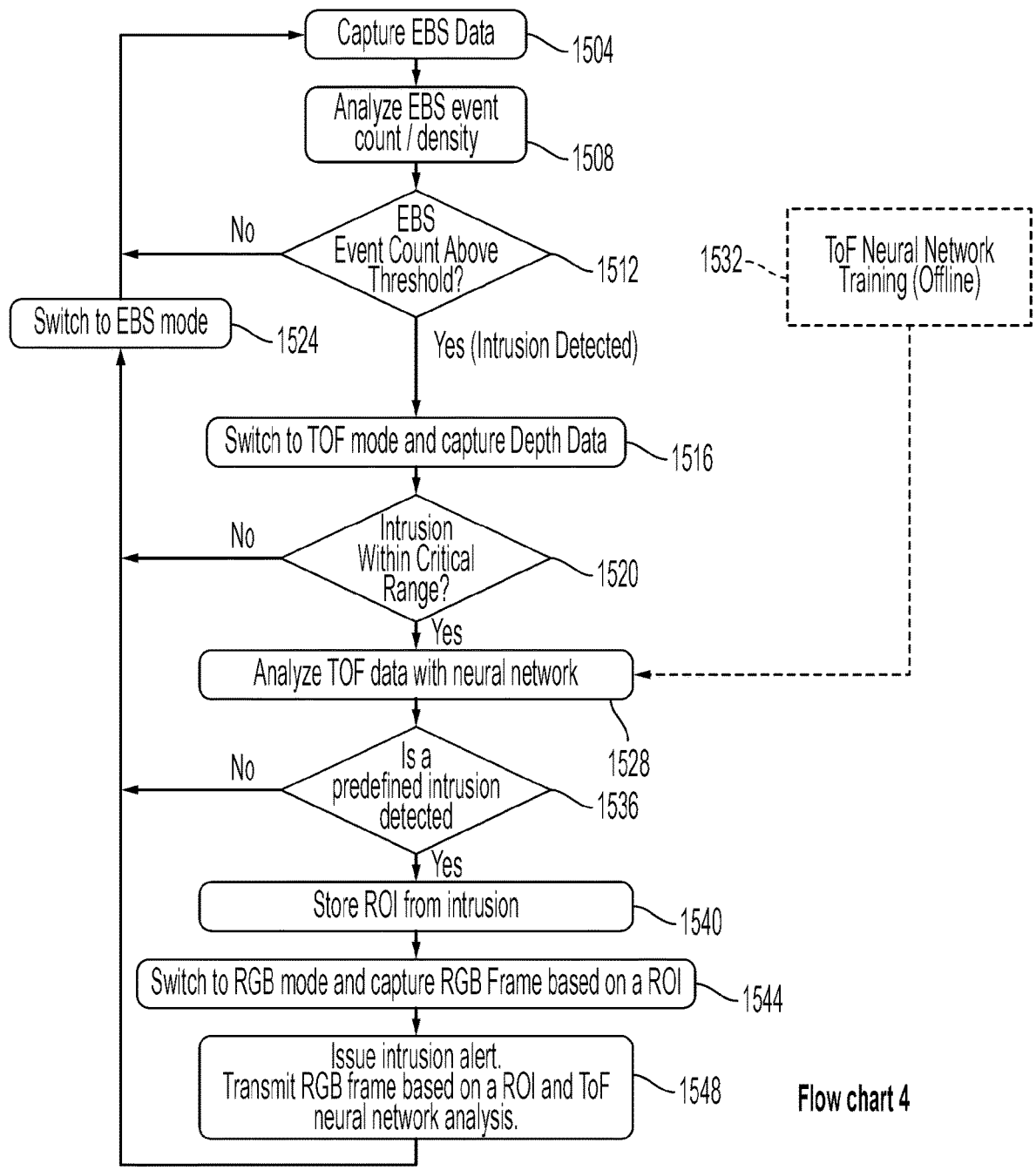
FIG. 15A is a flowchart depicting the operation of a sensor system in accordance with other embodiments of the present disclosure.
Figure 15B:
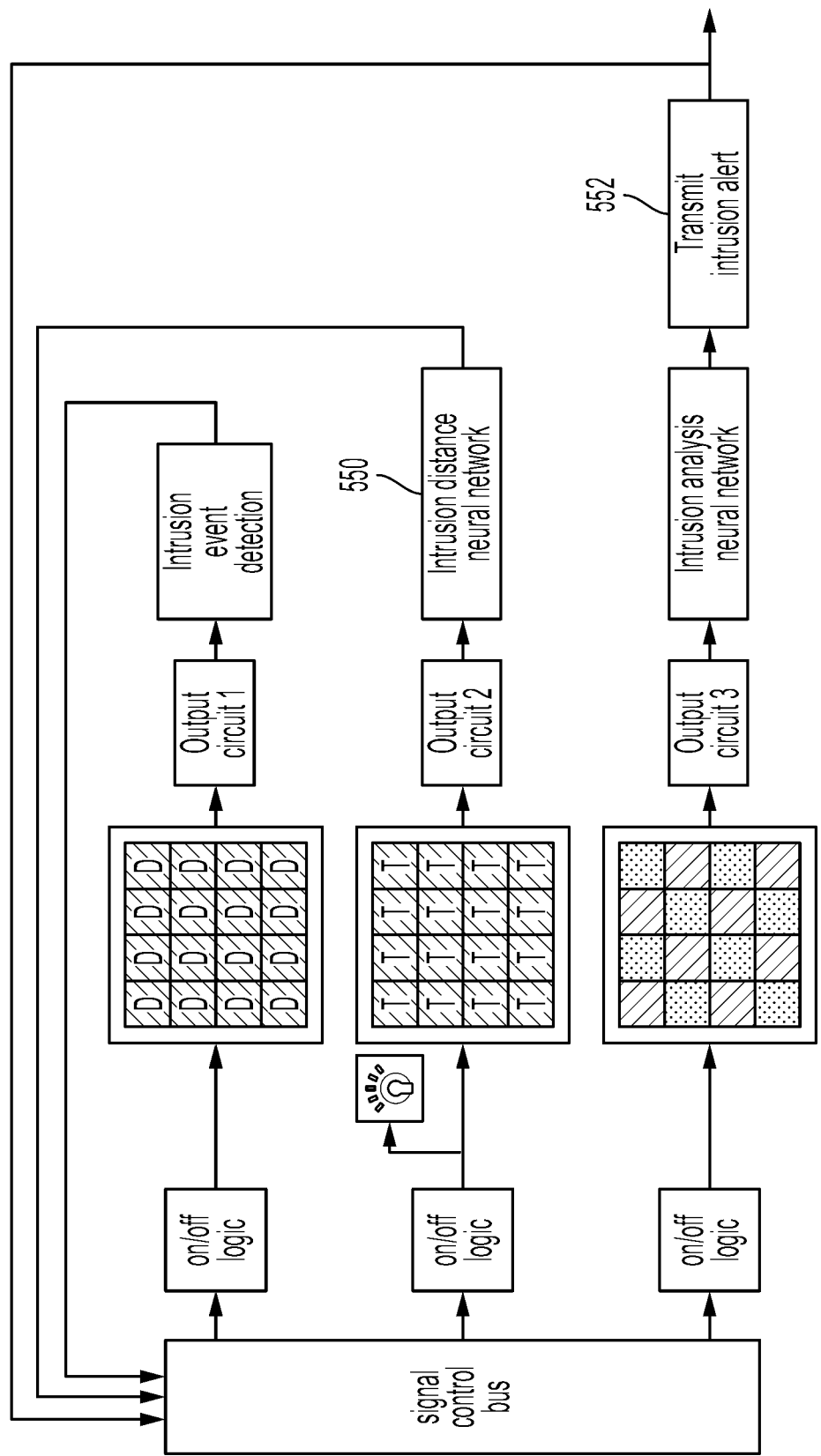
FIG. 15B is a block diagram of a sensor system configured to implement the operations of FIG. 15A.

FIG. 15A is a flowchart that illustrates aspects of the operation of a sensor system 100 in accordance with other embodiments of the present disclosure. The operations discussed in connection with the flowchart will also be described with reference to FIG. 15B, which is a block diagram of a sensor system 100 suitable for implementing a sensor system 100 capable of performing the described operations. Although the sensor system 100 is illustrated in FIG. 15B as including separate EBS 504, ToF 508, and RGB 512 sensors, it should be appreciated that other sensor configurations and combinations, including sensors with shared or combined functionalities, can be used in place of or in addition to single functionality sensors. In connection with at least some implementations of the operations discussed in connection with FIG. 15A and other operational examples discussed herein, the sensor system 100 is operated to monitor a scene.

As depicted in FIG. 15A, operation of the sensor system 100 includes the capture of EBS data by pixels 604 included in the EBS sensor 504 (step 1504). The EBS data is passed by the output circuit 528 to the intrusion event detection function 540. In the intrusion event detection function 540, the EBS event count and density is analyzed (step 1508). For example, the number of events within a defined time frame, and/or within a selected area of the array 310 of dedicated 604 or shared 620 or 636 event detection pixels is analyzed. If, at step 1512, the number of events and/or density of events is determined to be below selected threshold values, the process returns to step 1504, and the operation of the EBS sensor 504 is continued, without triggering operation of the other sensors 508 and 512.

If, at step 1512, the number of events and/or density of events is determined to be at or above selected threshold values, the intrusion event detection function 540 provides an intrusion event detection signal to the signal control bus 556. The intrusion event detection signal causes the ToF on/off logic 520 to switch on the time of flight sensor 508, thereby placing the sensor system 100 in a time of flight mode, in which depth data is acquired from the scene and captured (step 1516). As can be appreciated by one of skill in the art after consideration of the present disclosure, operation of the time of flight sensor 508 includes operation of the light source 112 that is used in connection with operation of the sensor 508 to obtain depth data from the scene.

At step 1520, a determination can be made as to whether an object 115 associated with the detected event is within a selected or critical range. This determination can be made by the intrusion distance analysis function 544 in response to an output from the output circuit 532. If the object 115 is not within the critical range, the sensor system 100 can be returned to the EBS mode (step 1524).

If the object 115 is determined to be within the critical range, the time of flight data is analyzed by an intrusion distance neural network 550 (step 1528). The intrusion distance neural network 550 can be a particular implementation of the intrusion distance analysis function 544 of other embodiments of the present disclosure. The intrusion distance neural network 550 can be trained in an off-line process (step 1532). In accordance with the least some embodiments of the present disclosure, the intrusion distance neural network 550 is trained to detect whether the intrusion meets predetermined characteristics. Examples of such characteristics can include the size, velocity, distance from the sensor system 100, or other characteristic of an object 115 they can be determined from ToF data. In response to a determination at step 1536 that a predefined intrusion has not been detected, the image system 100 can be switched back to a EBS only mode (step 1524).

In response to a determination at step 1536 that a predefined intrusion has been detected, a region of interest encompassing or corresponding to the object 115 is stored (step 1540). The sensor system is then switched to an imaging mode, and image data is captured based on the region of interest (step 1544). In accordance with the least some embodiments of the present disclosure, capturing information from within the region of interest includes activating only those image sensor 512 pixels that encompass or correspond to the region of interest. Next, an intrusion alert is issued (step 1548). The issuance of an intrusion alert can include transmitting an intrusion alert 552 that includes one or more frames of the imaging data collected from within the region of interest. Alternatively or in addition, the intrusion alert 552 can include information regarding the analysis of the time of flight data performed by the intrusion distance neural network 550.

A sensor system 100 in accordance with embodiments of the present disclosure incorporates EBS 504, ToF 508, and imaging sensors 512. By operating in a EBS mode, the system is capable of monitoring a scene for triggering events continuously. Because a EBS sensor 504 operates asynchronously, event detection is fast and has low latency, as it is not dependent on a sensor frame rate. In addition, EBS sensor 504 operation, even when performed continuously, as in at least some embodiments of the present disclosure, is more power efficient than other sensor technologies. Thus, continuous, persistent monitoring of a scene can be achieved with high efficiency by embodiments of the present disclosure.

Figure 16:
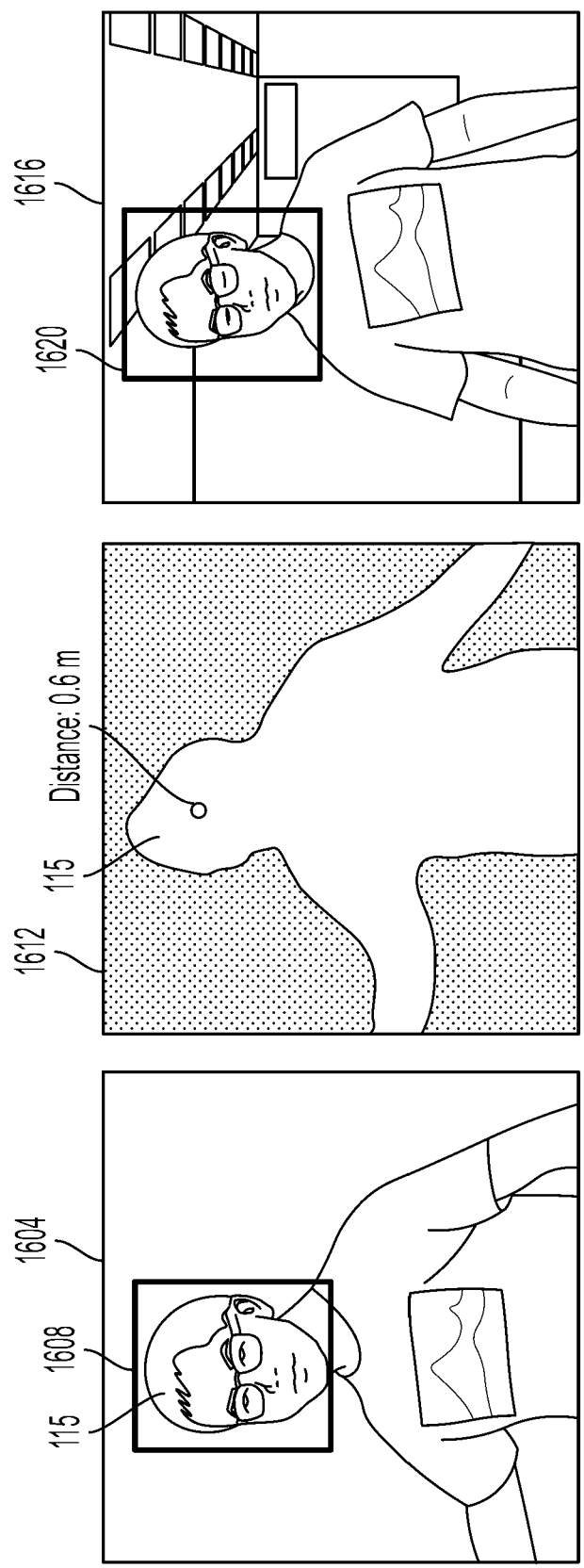
FIG. 16 illustrates an operational scenario in accordance with embodiments of the present disclosure.

For example, and with reference now to FIG. 16, a collection of EBS sensor 504 data 1604 can be analyzed. In response to determining from the EBS sensor 504 data 1604 that an object 115 comprising an intrusion has arrived within the monitored scene, operation of a ToF sensor 508 and/or an image sensor 512 can be commenced. The processing can simply consist of a determination that an event has occurred within the monitored scene or a selected area of the monitored scene. Alternatively, the EBS sensor 504 data 1604 can be analyzed to determine whether a frequency or number of events meets a threshold value. The EBS sensor 504 data 1604 can also be analyzed to determine whether a pattern of events within the EBS data 1604 matches a pattern of interest. As another example, the EBS sensor 504 data 1604 can be analyzed by a neural network, for example implemented by the processor system 130, to identify whether an event or set of events indicative of an intruder or other object of interest is present within a monitored scene. The processing of the EBS sensor 504 data 1604 can also be used to identify a region of interest 1608.

In response to a determination, based on an analysis of EBS data 1604, that an intruder or object of interest is present within a monitored scene, a ToF sensor 508 can be activated. The range or point cloud data 1612 collected by the ToF sensor can be used to determine a range or distance to the object 115, and thus to determine whether the object is within a critical range. As can be appreciated by one of skill in the art after consideration of the present disclosure, ToF sensors 508, and in particular the associated light source 112, can consume a relatively large amount of power. Accordingly, triggering operation of a ToF sensor 508 only in response to receiving an indication from EBS data 1604 that an intruder or other object of interest is present can result in significant power savings as compared to continuously operating the ToF sensor 508.

In response to determining that the object 115 is within the critical range from the ToF sensor 508 data 1612, an imaging sensor 512 can be activated. A frame or series of frames of image data 1616 collected by the imaging sensor 512 can be transmitted to an automated or manual authority for potential action in response to the presence of an intruder. In accordance with at least some embodiments, only a selected region 1620 of the pixel array 300 of the image sensor 512 is activated, to save on power requirements, transmission, and processing bandwidth. The selected region 1620 can be equal to or based on a region of interest 1608 identified within the EBS data 1604. The data from the selected region can be processed, for example by a neural network. The processing can include object identification or recognition. As can be appreciated by one of skill in the art after consideration of the present disclosure, embodiments of the present disclosure that only trigger the operation of an image sensor 512 after using a ToF sensor 508 to determine that an object 115 is within a critical range can avoid unnecessary activations. For example, such an arrangement avoids the collection, transmission, and analysis of image data 1616 that might otherwise be collected after a flash of light is incident on the EBS sensor 504 by ensuring that an object 115 is present within the monitored scene.

Figure 17A:
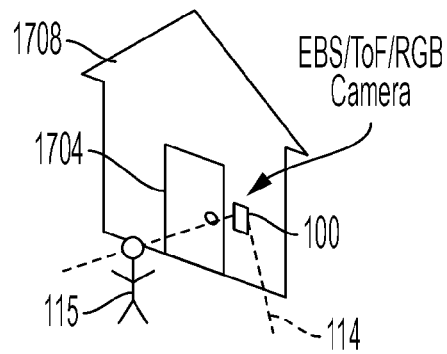
FIG. 17A depicts use cases for a sensor system in accordance with embodiments of the present disclosure.
Figure 17B:
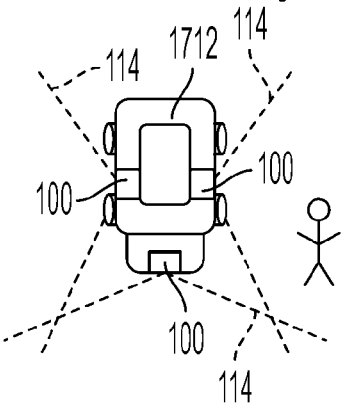
FIG. 17B depicts use cases for a sensor system in accordance with embodiments of the present disclosure.
Figure 17C:
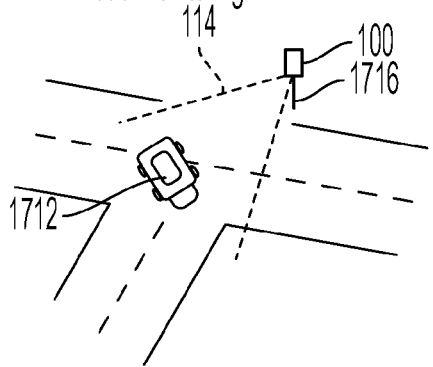
FIG. 17C depicts use cases for a sensor system in accordance with embodiments of the present disclosure.
Figure 17D:
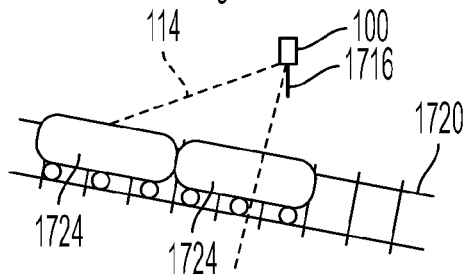
FIG. 17D depicts use cases for a sensor system in accordance with embodiments of the present disclosure.
Figure 17E:
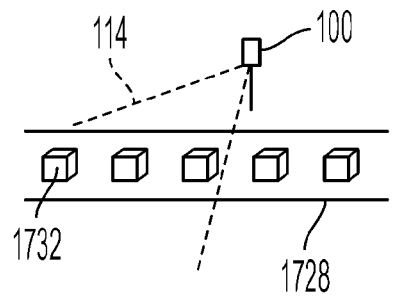
FIG. 17E depicts use cases for a sensor system in accordance with embodiments of the present disclosure.

FIGS. 17A-17E depict examples of use cases for a sensor system 100 in accordance with embodiments of the present disclosure. In particular, FIG. 17A depicts a scenario in which a sensor system 100 in accordance with embodiments of the present disclosure is positioned adjacent a front door 1704 of a home 1708. In this example, the object 115 is a person who has entered the field of view 114 of the sensor system 100. In FIG. 17B, a plurality of sensor systems 100 are mounted to a vehicle 1712 so as to provide overlapping fields of view 114, and are operated to detect objects 115, such as persons, other vehicles, stationary structures, and the like. In FIG. 17C, a sensor system 100 is mounted to a post or other structure 1716, and is positioned such that the field of view 114 encompasses an intersection or other portion of the road to monitor passing vehicles 1712 or other objects 115. In FIG. 17D, a sensor system 100 is mounted to a poster other structure 1716 and is positioned such that the field of view 114 encompasses a section of railway track 1720, to monitor passing railcars 1724 or other objects. In FIG. 17E, a sensor system 100 is mounted to a post 1716 or other structure such that the field of view 116 encompasses a production line, conveyor belt, or other pathway 1728 along which manufactured items 1732 or other objects are passing.

In the various illustrated operating scenarios of FIGS. 17A-17E, as an object 115 enters the field of view 114 of the sensor system 100, the EBS sensor 504 outputs a signal or signals based on a change in light intensity within the scene or field of view 114. In response to the EBS sensor 504 signal, the time of flight sensor 508 is activated. In particular, the light source 115 is operated to produce output light 116, at least some of which is incident on the object 115. Light reflected from the object 115 is received at the time of flight sensor 508, from which a range to the object number 115 is determined. In response to determining that the object number 115 is within a critical range of the sensor system 100, an imaging sensor 512 is activated. A frame or frames of image data may be processed and analyzed using automated or manual systems.

In accordance with embodiments of the present disclosure, event detection functions of the imaging system 100 can remain operational, even while time of flight and/or image sensing operations are being performed.

The various operations performed by the processing system 130 on the event detection data and/or the image data can include applying one or more neural networks to analyze the collected information.

Embodiments of the present disclosure provide sensor systems 100 that are capable of continuously monitoring a selected scene or area of scene using a EBS sensor 504. In response to determining that an event has occurred within the scene, a time of flight sensor 508 is operated to determine whether an object number 115 is within a critical range of the sensor system 100. If an object number 115 is determined to be within the critical range, an imaging sensor 512 is activated. Accordingly, embodiments of the present disclosure provide fast, asynchronous detection of events. In addition, power savings that can be realized by only triggering operation of a time of flight sensor in response to detecting an event. Power savings can further be realized by only triggering operation of an imaging sensor 512 in response to determining that an object 115 is a within a critical range. In addition, the selective activation of the imaging sensor can save on a data processing and transmission requirements. Further efficiencies can be obtained by performing analysis of some or all of the sensor 504, 508, and 512 outputs prior to triggering a next operation.

In accordance with the least some embodiments of the present disclosure, a EBS sensor 504 can operate continuously, even while a time of flight sensor 508 and/or an imaging sensor 512 is in operation. As noted elsewhere herein, a EBS sensor 504 general operates asynchronously. By continuing to operate the event detection sensor 504, event detection functions can be performed continuously, without loss or diminution of temporal event detection performance of the sensor system 100.

Figure 18:
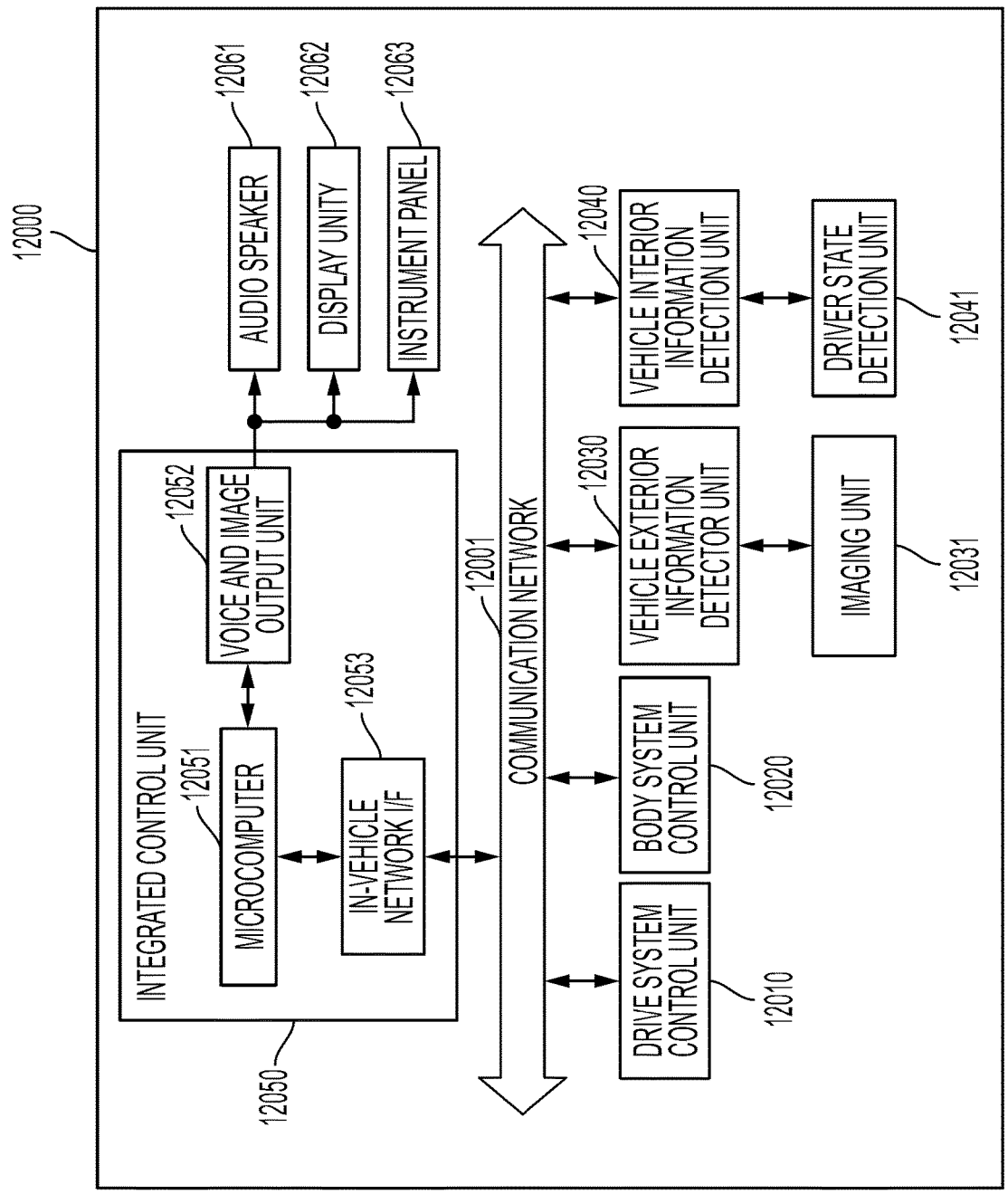
FIG. 18 is a block diagram illustrating an example of a schematic configuration of a vehicle control system.

FIG. 18 is a block diagram illustrating a schematic configuration example of a vehicle control system that is an example of a moving body control system to which the technology according to the present disclosure is applicable.

A vehicle control system 12000 includes a plurality of electronic control units or processor systems that are connected to each other through a communication network 12001. In the example illustrated in FIG. 18, the vehicle control system 12000 includes a drive system control unit 12010, a body system control unit 12020, a vehicle exterior information detection unit 12030, a vehicle interior information detection unit 12040, and an integrated control unit 12050. In addition, as a functional configuration of the integrated control unit 12050, a microcomputer 12051, a voice and image output unit 12052, and an in-vehicle network I/F (interface) 12053 are illustrated in the drawing.

The drive system control unit 12010 controls an operation of a device relating to the drive system of the vehicle in accordance with various programs. For example, the drive system control unit 12010 functions as a control device of a drive force generation device such as an internal combustion engine and a drive motor which generate a drive force of the vehicle, a drive force transmission mechanism that transmits the drive force to wheels, a steering mechanism that adjusts a steering angle of the vehicle, and a braking device that generates a braking force of the vehicle, and the like.

The body system control unit 12020 controls an operation of various devices which are mounted to a vehicle body in accordance with various programs. For example, the body system control unit 12020 functions as a control device of a keyless entry system, a smart key system, a power window device, and various lamps such as a head lamp, a back lamp, a brake lamp, a blinker, and a fog lamp. In this case, an electric wave that is transmitted from a portable device that substitutes for a key, or signals of various switches can be input to the body system control unit 12020. The body system control unit 12020 receives input of the electric wave or the signals, and controls a door lock device, a power window device, a lamp, and the like of the vehicle.

The vehicle exterior information detection unit 12030 detects information regarding an outer side of the vehicle on which the vehicle control system 12000 is mounted. For example, an imaging unit 12031 is connected to the vehicle exterior information detection unit 12030. The vehicle exterior information detection unit 12030 allows the imaging unit 12031 to capture a vehicle exterior image, and receives the captured image. The vehicle exterior information detection unit 12030 may perform object detection processing of a person, a vehicle, an obstacle, a sign, a character on a load, or the like or distance detection processing on the basis of the image that is received.

The imaging unit 12031 is an optical sensor that receives light and outputs an electric signal corresponding to a light-reception amount. The imaging unit 12031 may output the electric signal as an image or as distance measurement information. In addition, light received by the imaging unit 12031 may be visible light, or invisible light such as infrared rays. Moreover, the imaging unit 12031 can include a an image sensor 200 incorporating a pixel array unit 300 with the unit pixels 310 configured and isolated from other unit pixels 310 within the pixel array unit 300 in accordance with embodiments of the present disclosure.

The vehicle interior information detection unit 12040 detects vehicle interior information. For example, a driver state detection unit 12041 that detects a driver state is connected to the vehicle interior information detection unit 12040. For example, the driver state detection unit 12041 includes a camera that images a driver, and the vehicle interior information detection unit 12040 may calculate the degree of fatigue or the degree of concentration of a driver on the basis of detection information that is input from the driver state detection unit 12041, or may determine whether or not the driver drowses.

The microcomputer 12051 calculates a control target value of the drive force generation device, the steering mechanism, or the braking device on the basis of vehicle interior or exterior information that is acquired by the vehicle exterior information detection unit 12030 or the vehicle interior information detection unit 12040, and can output a control command to the drive system control unit 12010. For example, the microcomputer 12051 can perform a cooperative control to realize a function of an advanced driver assistance system (ADAS) which includes collision avoidance or impact mitigation of the vehicle, following travel based on an intervehicle distance, vehicle speed maintenance travel, vehicle collision alarm, vehicle lane deviation alarm, and the like.

In addition, the microcomputer 12051 can perform a cooperative control for automatic driving and the like in which the vehicle autonomously travels without depending on an operation of a driver by controlling the drive force generation device, the steering mechanism, the braking device, and the like on the basis of information in the vicinity of the vehicle which is acquired by the vehicle exterior information detection unit 12030 or the vehicle interior information detection unit 12040.

The microcomputer 12051 can output a control command to the body system control unit 12020 on the basis of the vehicle exterior information acquired by the vehicle exterior information detection unit 12030. For example, the microcomputer 12051 can perform a cooperative control to realize glare protection such as switching of a high beam into a low beam by controlling the head lamp in correspondence with a position of a preceding vehicle or an oncoming vehicle which is detected by the vehicle exterior information detection unit 12030.

The voice and image output unit 12052 transmits at least one output signal between a voice and an image to an output device capable of visually or aurally notifying a passenger in a vehicle or an outer side of the vehicle of information. In the example in FIG. 15, as the output device, an audio speaker 12061, a display unit 12062, and an instrument panel 12063 are exemplified. For example, the display unit 12062 may include at least one of an on-board display or a head-up display.

Figure 19:
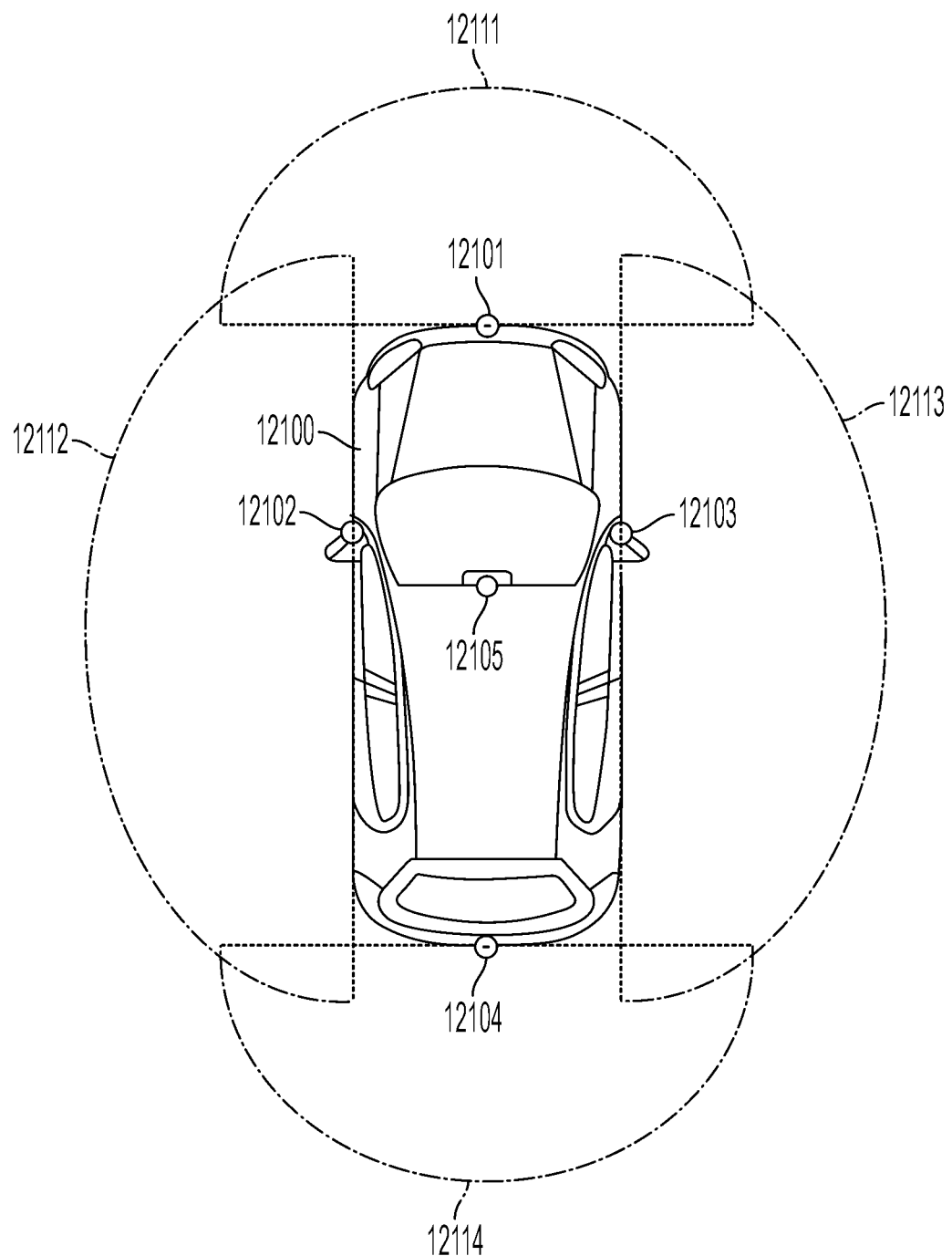
FIG. 19 is a view illustrating an example of an installation position of an out-of-vehicle information detection unit and an imaging unit.

FIG. 19 is a view illustrating an example of an installation position of the imaging unit 12031.

In FIG. 19, as the imaging unit 12031, imaging units 12101, 12102, 12103, 12104, and 12105 are provided.

For example, the imaging units 12101, 12102, 12103, 12104, and 12105 are installed at positions such as a front nose, a side-view mirror, a rear bumper, a back door, and an upper side of a windshield in a vehicle room, of the vehicle 12100. The imaging unit 12101 provided at the front nose, and the imaging unit 12105 that is provided on an upper side of the windshield in a vehicle room mainly acquire images on a forward side of the vehicle 12100. The imaging units 12102 and 12103 which are provided in the side-view mirror mainly acquire images on a lateral side of the vehicle 12100. The imaging unit 12104 that is provided in the rear bumper or the back door mainly acquires images on a backward side of the vehicle 12100. The imaging unit 12105 that is provided on an upper side of the windshield in the vehicle room can be mainly used to detect a preceding vehicle, a pedestrian, an obstacle, a traffic signal, a traffic sign, a vehicle lane, and the like.

Furthermore, FIG. 19 illustrates an example of a photographing range of the imaging units 12101 to 12104. An image capturing range 12111 represents an image capturing range of the imaging unit 12101 that is provided in the front nose, image capturing ranges 12112 and 12113 respectively represent image capturing ranges of the imaging units 12102 and 12103 which are provided in the side-view mirrors, an image capturing range 12114 represents an image capturing range of the imaging unit 12104 that is provided in the rear bumper or the back door. For example, when a plurality of pieces of image data captured by the imaging units 12101 to 12104 are superimposed on each other, it is possible to obtain an overlooking image when the vehicle 12100 is viewed from an upper side.

At least one of the imaging units 12101 to 12104 may have a function of acquiring distance information. For example, at least one of the imaging units 12101 to 12104 may be a stereo camera including a plurality of imaging elements, or may be an imaging element that includes pixels for phase difference detection.

For example, the microcomputer 12051 can extract a three-dimensional object, which is a closest three-dimensional object, particularly, on a proceeding path of the vehicle 12100 and travels in approximately the same direction as that of the vehicle 12100 that travels at a predetermined velocity (for example, 0 km/h or greater), as a preceding vehicle by obtaining distances to respective three-dimensional objects in the image capturing ranges 12111 to 12114 and a variation of the distances with the passage of time (relative velocity to the vehicle 12100) on the basis of the distance information obtained from the imaging units 12101 to 12104. In addition, the microcomputer 12051 can set a distance between vehicles to be secured in advance in front of the preceding vehicle to perform automatic brake control (also including a following stop control), an automatic acceleration control (also including a following acceleration control), and the like. As described above, it is possible to perform a cooperative control for automatic driving in which a vehicle autonomously travels without depending on an operation by a driver, and the like.

For example, the microcomputer 12051 can extract three-dimensional object data relating to a three-dimensional object by classifying a plurality of pieces of the three-dimensional object data into data of a two-wheel vehicle, data of typical vehicle, data of a large-sized vehicle, data of pedestrian, and data of other three-dimensional objects such as an electric pole on the basis of the distance information obtained from the imaging units 12101 to 12104, and can use the three-dimensional object data for automatic obstacle avoidance. For example, the microcomputer 12051 discriminates obstacles at the periphery of the vehicle 12100 into an obstacle that is visually recognized by a driver of the vehicle 12100 and an obstacle that is difficult for the driver to visually recognize. In addition, the microcomputer 12051 determines collision risk indicating the degree of danger of collision with each of the obstacles. In a situation in which the collision risk is equal to or greater than a set value, and collision may occur, the microcomputer 12051 can assist driving for collision avoidance by outputting an alarm to the driver through the audio speaker 12061 or the display unit 12062, or by performing compulsory deceleration or avoidance steering through the drive system control unit 12010.

At least one of the imaging units 12101 to 12104 may be an infrared camera that detects infrared rays. For example, the microcomputer 12051 can recognize a pedestrian by determining whether or not the pedestrian exists in images captured by the imaging units 12101 to 12104. For example, the pedestrian recognition is performed by a procedure of extracting a specific point in the images captured by the imaging units 12101 to 12104 as an infrared camera, and a procedure of performing pattern matching processing for a series of specific points indicating a contour line of an object to determine whether or not the object is a pedestrian. When the microcomputer 12051 determines that a pedestrian exists on the images captured by the imaging units 12101 to 12104, and recognizes the pedestrian, the voice and image output unit 12052 controls the display unit 12062 to overlap and display a quadrangular contour line for emphasis on the pedestrian who is recognized. In addition, the voice and image output unit 12052 may control the display unit 12062 to display an icon indicating the pedestrian or the like at a desired position.

Hereinbefore, description has been given of an example of the vehicle control system to which the technology according to the present disclosure is applicable. The technology according to the present disclosure is applicable to the imaging unit 12031, the driver state detection unit 12041, and the like among the above-described configurations.

Hereinbefore, embodiments of the present disclosure have been described, but the technical range of the present disclosure is not limited to the above-described embodiments, and various modifications can be made in a range not departing from the gist of the present disclosure. In addition, constituent elements in other embodiments and modification examples may be appropriately combined.

In addition, the effects in the embodiments described in this specification are illustrative only, and other effect may exist without a limitation.

Furthermore, the present technology can include the following configurations.

(1)
A system comprising:
a light source that outputs light in a selected wavelength range;
a first pixel group that detects a change in light intensity;
a second pixel group that detects an amount of light in the selected wavelength range;
a processor to:
receive at least one event signal based on the change in light intensity detected by the first pixel group;
detect a first event based on the at least one event signal; and
activate, in response to detecting the first event, the second pixel group.

(2)
The system of (1), wherein the processor detects a second event based on an output of the second pixel group.

(3)
The system of (1) or (2), further comprising a third pixel group that detects an amount of light intensity, wherein the processor activates, in response to detecting the second event, the third pixel group.

(4)
The system of (3), further comprising:
a plurality of photoelectric conversion regions, wherein at least two of the first, second, and third pixel groups share the plurality of photoelectric regions.

(5)
The system of (3) or (4), wherein the first pixel group includes event detection pixels, wherein the second pixel group includes time of flight pixels, and wherein the third pixel group includes image sensor pixels.

(6)
The system of any of (3) to (4), wherein the first pixel group is disposed on a first sensor substrate, wherein the second pixel group is disposed on a second sensor substrate, and wherein the third pixel group is disposed on a third sensor substrate.

(7)
The system of (3), wherein the first pixel group and the third pixel group are disposed on a first sensor substrate, and wherein the second pixel group is disposed on a second sensor substrate.

(8)
The system of (7), wherein pixels in the first pixel group are interspersed among pixels in the third pixel group.

(9)
The system of any of (3) to (8), wherein the number of pixels in the first pixel group is less than the number of pixels in the third pixel group.

(10)
The system of (7), wherein the pixels of the first pixel group share photoelectric conversion elements with the pixels of the third pixel group.

(11)
The system of (3), wherein the first pixel group is disposed on a first sensor substrate, and wherein the second pixel group and the third pixel group is disposed on a second sensor substrate.

(12)
The system of (11), wherein pixels in the second pixel group are interspersed among pixels in the third pixel group.

(13)
The system of (12), wherein the number of pixels in the second pixel group is less than the number of pixels in the third pixel group.

(14)
The system of (3), wherein the first, second, and third pixel groups are formed on a first substrate.

(15)
The system of (3), wherein a number pixels in the first pixel group is less than a number of pixels in the third pixel group.

(16)
The system of (3), wherein the second event is a determination that an object is within a predetermined range of the sensor system.

(17)
The system of (16), wherein the processor implements a first neural network that issues an intrusion alert based on an analysis of an output of the third pixel group.

(18)
The system of (17), wherein the processor implements a second neural network that triggers the third pixel group based on an analysis of an output of the second pixel group.

(19)
An imaging system, comprising:
a plurality of event based sensor pixels;
a plurality of time of flight sensor pixels; and
a plurality of image sensor pixels, wherein the time of flight sensor pixels are activated in response to an event detection signal from one or more event based sensor pixels, and wherein the image sensor pixels are activated in response to a distance signal from one or more time of flight sensor pixels that places an object within a predetermined distance of the imaging system.

(20)
An intrusion detection method, comprising:
activating a plurality of event based sensor pixels;
in response to an output from at least some of the event based sensor pixels, activating a plurality of time of flight sensor pixels and a light source;
in response to an output from the time of flight sensor pixels, activating a plurality of image sensor pixels;
analyzing an output from the image sensor pixels using a neural network; and based on analyzing the output from the image sensor pixels using the neural network and determining that an intrusion alert should be issued, issuing an intrusion alert.

What is claimed is:

1. A system comprising:
a light source that outputs light in a selected wavelength range;
a first pixel group that asynchronously detects a changes in light intensity to output event signals having value that are based on the changes in light intensity asynchronously detected by the first pixel group;
a second pixel group that detects an amount of light in the selected wavelength range for generating depth images;
a third pixel group that detects an amount of light intensity for generating color images; and
a processor to:
monitor at least one of a number and a density of the event signals output from the first pixel group;
determine that at least one of the number and the density of event signals is greater than a respective threshold value, and in response:
switch the second pixel group from inactive to active;
generate a depth image based on output of the activated second pixel group;
determine that the depth image contains an intruding object that caused at least one of the number and the density of event signal to be greater than a respective threshold value;
determine, while the second pixel group is still active, whether the intruding object in the depth image is within a selected range of the system;
when the intruding object in the depth image is determined to not be within the selected range, deactivate the second pixel group and return to monitoring the event signals; and
when the intruding object in the depth image is determined to be within the selected range:
determine a subset of pixels in the third pixel group that correspond to a region of interest in the depth image that contains the intruding object;
switch the subset of pixels in the third pixel group from inactive to active while keeping remaining pixels in the third pixel group inactive; and
generate a color image of the region of interest based on output of the activated subset of pixels in the third pixel group.

2. The system of claim 1, wherein the change in light intensity is an instantaneous change in light intensity.

3. The system of claim 1, further comprising:
a plurality of photoelectric conversion regions, wherein at least two of the first, second, and third pixel groups share the plurality of photoelectric conversion regions.

4. The system of claim 1, wherein the first pixel group includes event detection pixels, wherein the second pixel group includes time of flight pixels, and wherein the third pixel group includes image sensor pixels.

5. The system of claim 1, wherein the first pixel group is disposed on a first sensor substrate, wherein the second pixel group is disposed on a second sensor substrate, and wherein the third pixel group is disposed on a third sensor substrate.

6. The system of claim 1, wherein the first pixel group and the third pixel group are disposed on a first sensor substrate, and wherein the second pixel group is disposed on a second sensor substrate.

7. The system of claim 6, wherein pixels in the first pixel group are interspersed among pixels in the third pixel group.

8. The system of claim 7, wherein the number of pixels in the first pixel group is less than the number of pixels in the third pixel group.

9. The system of claim 6, wherein pixels of the first pixel group share photoelectric conversion regions with pixels of the third pixel group.

10. The system of claim 1, wherein the first pixel group is disposed on a first sensor substrate, and wherein the second pixel group and the third pixel group are disposed on a second sensor substrate.

11. The system of claim 10, wherein pixels in the second pixel group are interspersed among pixels in the third pixel group.

12. The system of claim 11, wherein the number of pixels in the second pixel group is less than the number of pixels in the third pixel group.

13. The system of claim 1, wherein the first, second, and third pixel groups are formed on a first substrate.

14. The system of claim 1, wherein a number pixels in the first pixel group is less than a number of pixels in the third pixel group.

15. The system of claim 1, wherein the processor implements a neural network that issues an intrusion alert based on an analysis of the output of the activated subset of pixels in the third pixel group.

16. The system of claim 1, wherein the processor implements a neural network that triggers activation of the third pixel group based on an analysis of the output of the activated second pixel group.

17. An imaging system, comprising:
a plurality of event based sensor pixels to output event signals having values that are based on changes in light intensity asynchronously detected by the plurality of event based sensor pixels;
a plurality of time of flight sensor pixels for generating depth images;
a plurality of image sensor pixels for generating color images; and
a processor to:
monitor at least one of a number and a density of the event signals output from the plurality of event based sensor pixels;
determine that at least one of the number and the density of the event signals is greater than a respective threshold value, and in response:
switch the plurality of time of flight sensor pixels from inactive to active;
generate a depth image based on output of the activated plurality of time of flight sensor pixels;
determine that the depth image contains an intruding object that caused at least one of the number and the density of the event signals to be greater than the respective threshold value;
determine, while the plurality of time of flight sensor pixels is activated, whether the intruding object in the depth image is within a predetermined selected range of the plurality of time of flight sensor pixels;
when the intruding object in the depth image is determined to not be within the selected range, deactivate the plurality of time of flight sensor pixels and return to monitoring the event signals; and
when the intruding object in the depth image is determined to be within the selected range:

determine a subset of pixels in the plurality of image sensor pixels that correspond to a region of interest in the depth image that contains the intruding object;

switch the subset of pixels in the plurality of image sensor pixels from inactive to active while keeping remaining pixels in the plurality of image sensor pixels inactive; and generate a color image of the region of interest based on output of the activated subset of pixels in the plurality of image sensor pixels.

* * * * *